(12) United States Patent  
Nagai

(10) Patent No.: US 10,552,092 B2  
(45) Date of Patent: Feb. 4, 2020

(54) IMAGE FORMING APPARATUS AND IMAGE PROCESSING SYSTEM

(71) Applicant: SHARP KABUSHIKI KAISHA, Sakai, Osaka (JP)

(72) Inventor: Yuhsuke Nagai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/241,519

(22) Filed: Jan. 7, 2019

(65) Prior Publication Data

US 2019/0220232 A1    Jul. 18, 2019

(30) Foreign Application Priority Data

Jan. 12, 2018   (JP) ................................. 2018-003575

(51) Int. Cl.
```
G06F 3/12      (2006.01)
H04N 1/00      (2006.01)
G06K 15/00     (2006.01)
```

(52) U.S. Cl.
CPC .......... *G06F 3/1203* (2013.01); *G06F 3/1211* (2013.01); *G06F 3/1236* (2013.01); *H04N 1/00214* (2013.01); *H04N 1/00233* (2013.01); *H04N 1/00244* (2013.01)

(58) Field of Classification Search
None
See application file for complete search history.

(56) References Cited

U.S. PATENT DOCUMENTS

| | | | | |
|---|---|---|---|---|
| 2007/0097408 A1* | 5/2007 | Ohkado | ................. | G03G 21/02 358/1.14 |
| 2011/0261396 A1* | 10/2011 | Takahashi | ............. | G06F 3/1204 358/1.15 |
| 2011/0299120 A1* | 12/2011 | Sekine | .................. | G06F 3/1221 358/1.15 |
| 2016/0378406 A1* | 12/2016 | Kaku | .................... | G06F 3/1205 358/1.15 |

FOREIGN PATENT DOCUMENTS

| | | |
|---|---|---|
| JP | 2012-039527 A | 2/2012 |
| JP | 2014-008616 A | 1/2014 |

* cited by examiner

*Primary Examiner* — Dov Popovici  
(74) *Attorney, Agent, or Firm* — ScienBiziP, P.C.

(57) ABSTRACT

A storage unit that stores user use frequency information including a use count of a user, who uses an image forming apparatus, for each of image forming apparatuses, and that temporarily saves a print file which is input; a use frequency confirmation unit that confirms a use frequency of a given user for each of the image forming apparatuses by using the user use frequency information; and a file movement request unit that moves the print file, which is temporarily saved in the storage unit, to a different image forming apparatus are included. The use frequency confirmation unit selects one image forming apparatus which satisfies a predetermined movement condition by using the confirmed use frequency for each of the image forming apparatuses, and the file movement request unit moves the print file, which is temporarily saved in the storage unit, to the selected image forming apparatus.

11 Claims, 13 Drawing Sheets

FIG. 4A

| FILE NAME FN | USER NAME UN | SAVING APPARATUS INFORMATION HM |
|---|---|---|
| FL01 | US01 | PM1 |
| FL02 | US01 | CM1 |
| FL03 | US02 | PM1 |
| ⋮ | ⋮ | ⋮ |
| FL50 | US03 | CM2 |

FIG. 4B

| USER NAME UN | TOTAL USE COUNT AM | USED APPARATUS INFORMATION HM | USE COUNT CT |
|---|---|---|---|
| US01 | 20 | PM1 | 4 (20%) |
| | | CM1 | 14 (70%) |
| | | CM2 | 2 (10%) |
| US02 | 10 | PM1 | 3 (30%) |
| | | CM1 | 3 (30%) |
| | | CM2 | 4 (40%) |

FIG. 4C

| NUMBER OF TIMES OF DETERMINING FREQUENCY M0 | FREQUENCY DETERMINATION RATIO N0 | DETERMINATION VALIDITY/INVALIDITY INFORMATION H0 |
|---|---|---|
| 9 TIMES | 50% | VALID (1) |
| | | INVALID (0) |

FIG. 4D

| OWN REMAINING CAPACITY INFORMATION | RC | 8 GB |
|---|---|---|
| REMAINING CAPACITY DETERMINATION INFORMATION | R0 | 10 GB |

IMAGE FORMING APPARATUS AND IMAGE PROCESSING SYSTEM

BACKGROUND

1. Field

The present disclosure relates to an image forming apparatus and an image processing system, and particularly relates to an image forming apparatus and an image processing system that are able to, in an environment where a plurality of image forming apparatuses are connected to a network, print a print file including image information or the like in a desired image forming apparatus.

2. Description of the Related Art

In an existing environment where a plurality of image forming apparatuses are connected to a network, a print file to be printed is transmitted from an information processing apparatus of a user, which is connected to the same network, to a designated image forming apparatus and information of the print file is printed on a sheet.

Moreover, a printing system has been also used that a plurality of image forming apparatuses and a dedicated print server are connected to a network and a print file transmitted from an information processing apparatus of a user is temporarily saved in the print server, and then, the user goes to a desired image forming apparatus in which image information of the print file is to be printed and inputs a print request of the print file in the image forming apparatus and thereby acquires the print file, which is temporarily saved in the print server, from the print server and executes printing of the information of the print file in the desired image forming apparatus.

Further, a printing system has been also used that in an environment where there is no print server and a plurality of image forming apparatuses are connected to a network, one image forming apparatus A is set as a master device that has a function as a print server, and the master device temporarily saves all print files that are transferred, and in response to a print request from another image forming apparatus B, transmits a given print file to the image forming apparatus B, so that printing of information of the print file is executed in the image forming apparatus B.

Japanese Unexamined Patent Application Publication No. 2014-8616 proposes a printing system in which a plurality of image forming apparatuses of MFPs are connected each other via a network, and in a case where a user instructs a given MFP to display a list of print data, authentication processing of the user is executed, and after the authentication is succeeded, a list of print data of the user who has succeeded in the authentication, which is stored in the given MFP, is displayed and a list of print data of the user who has succeeded in the authentication, which is stored in a different MFP, is further received from the different MFP and displayed, and in a case where print data selected by the user from the list of the print data that is displayed is stored in the different MFP, the print data is acquired from the different MFP and printing is executed.

Japanese Unexamined Patent Application Publication No. 2012-39527 proposes an image processing system in which in an environment where a plurality of user terminals in which image data is stored and a plurality of image forming apparatuses are connected to a network, a user ID and an IP address of a user terminal are stored in association with each other in the image forming apparatuses, and a user moves to a desired image forming apparatus and inputs a user ID to the image forming apparatus to perform authentication processing, and in a case where the authentication is succeeded, the image forming apparatus transmits request information to a user terminal corresponding to the user ID that is input, receives image data stored in the user terminal from the user terminal, and prints an image of the image data on a sheet.

However, in an existing printing system using a dedicated print server, the dedicated print server needs to be introduced separately from an image forming apparatus, and thus construction costs of the system increase, and data to be printed is all concentratedly saved in the print server, and therefore, in a case where the print server is not available after a print file is saved in the print server, such as a case where the print server is under maintenance, it is difficult to print electronic data in a desired image forming apparatus.

Additionally, an image forming apparatus generally includes a storage device to execute a copy function, a scanner function, and the like, and in a case where one image forming apparatus is set as a master device having a function as a print server, in order to execute the function as the print server, a storage capacity to temporarily save all print files that are transferred needs to be secured in advance. That is, the master device needs to secure the storage capacity for the function of the print server in addition to securing a required storage capacity to execute original functions of the image forming apparatus, such as the copy function and the scanner function. Accordingly, the master device has a less storage capacity usable for temporarily saving a print file than that of a dedicated print server in some cases.

Further, there is also a problem that in a case where reception of a print file by the function of the print server and transmission of a print file to another image forming apparatus are concentrated, an original function of the image forming apparatus, such as the copy function, may be affected and processing capability may be lowered.

Similarly to the problem caused when the print server is used, print files to be printed are all saved concentratedly in the master device, and therefore, when the master device is not available after a print file is saved in the master device, it is difficult for the print file to be printed in another image forming apparatus.

According to Japanese Unexamined Patent Application Publication No. 2014-8616, in a case where a user instructs an MFP to display a list of print data, authentication processing is always executed in the MFP and a list of print data of the user who has succeeded in the authentication is received from all other MFPs, and further, in a case where the print data selected by the user is stored in a different MFP, printing is executed after the print data is acquired from the different MFP. Accordingly, it takes time to acquire the print data and the user waits for completion of printing for a long time in some cases. Additionally, even in a case of an MFP which a user frequently instructs to execute printing, when print data of the user is not stored in the MFP and the print data is acquired from another MFP, it takes time to transfer the print data and it is difficult to quickly complete printing. In order to quickly complete printing of print data of a specific user, it is desired that print data of the user is temporarily saved in the MFP which the user frequently instructs to execute printing.

According to Japanese Unexamined Patent Application Publication No. 2012-39527, though neither a print server nor an image forming apparatus serving as a master device is required, when a user causes a desired image forming apparatus to perform printing, a user terminal in which image data is stored needs to be always connected to a network, and in a state where a plurality of pieces of image data to be printed are stored in the user terminal, all the plurality of pieces of image data are only able to be printed and it is difficult to selectively print only desired image data.

Thus, it is desirable to provide an image forming apparatus and an image processing system in which, without providing a dedicated print server, in consideration of a use frequency of each user for an image forming apparatus, a remaining storage capacity of an image forming apparatus in which a print file is temporarily saved, or the like, the print file is saved in a distributed manner in a plurality of image forming apparatuses to avoid concentration of access to one image forming apparatus, and thus a print time of the print file is able to be shortened.

SUMMARY

The disclosure provides an image forming apparatus having a print function, and the image forming apparatus includes: an information input unit that inputs a print file; a storage unit that stores user use frequency information including a use count of a user, who uses the image forming apparatus and a different image forming apparatus, for each of the image forming apparatuses, and that temporarily saves the print file which is input; a communication unit that exchanges information with the different image forming apparatus connected to a network; a use frequency confirmation unit that confirms a use frequency of a given user for each of the image forming apparatuses by using the user use frequency information; and a file movement request unit that moves the print file, which is temporarily saved in the storage unit, to the different image forming apparatus, in which the use frequency confirmation unit selects one image forming apparatus which satisfies a predetermined movement condition by using the confirmed use frequency for each of the image forming apparatuses, and the file movement request unit moves the print file, which is temporarily saved in the storage unit, to the selected image forming apparatus.

The disclosure provides an image processing system comprising one first image forming apparatus and one or more second image forming apparatuses that are connected to each other by a network, in which the first and second image forming apparatuses each include: an information input unit that inputs a print file; a storage unit that temporarily saves the print file that is input; a communication unit that exchanges information with an image forming apparatus connected to the network; a file acquisition request unit that acquires the print file from a different image forming apparatus; and a print execution unit that prints information of a given print file on a sheet, the first image forming apparatus stores, in the storage unit of the first image forming apparatus, print data management information of specifying, for each of users, an image forming apparatus in which a print file input by the user is temporarily saved and user use frequency information including a use count of the user, who uses the first image forming apparatus and the one or more second image forming apparatuses, for each of the image forming apparatuses, the first image forming apparatus includes: a use frequency confirmation unit that confirms a use frequency of a given user for each of the image forming apparatuses by using the user use frequency information; and a file movement request unit that moves a print file, which is temporarily saved in the storage unit of the first image forming apparatus, to the second image forming apparatus, the use frequency confirmation unit selects a second image forming apparatus that satisfies a predetermined movement condition by using the confirmed use frequency for each of the image forming apparatuses, the file movement request unit moves, to the selected second image forming apparatus, the print file temporarily saved in the storage unit of the first image forming apparatus, and in a case where any image forming apparatus acquires the print data management information from the first image forming apparatus and uses the print data management information to select a print file desired to be printed and input a print request of the selected print file, the file acquisition request unit acquires the selected print file from the first or second image forming apparatus in which the selected print file is saved, and the print execution unit of the any image forming apparatus prints information of the selected print file on a sheet.

The disclosure provides an image processing system comprising one first image forming apparatus and one or more second image forming apparatuses that are connected to each other by a network, in which a print file is saved in a distributed manner in the first and second image forming apparatuses based on a use frequency of each of users who use the image forming apparatuses for each of the image forming apparatuses, print data management information of specifying, for each of the users, the first or second image forming apparatus in which a print file input by the user is temporarily saved is stored in the first image forming apparatus, a print file of a given user, which is temporarily saved in the first image forming apparatus, is moved to the second image forming apparatus that is frequently used by the user, in a case of satisfying a predetermined movement condition in consideration of a use frequency of the user, and in any image forming apparatus, by using the print data management information acquired from the first image forming apparatus, a print file desired to be printed is acquired from the first or second image forming apparatus in which the desired print file is saved, and then, printing is performed.

The disclosure provides a file printing method of an image processing system including one first image forming apparatus and one or more second image forming apparatuses that are connected to each other by a network, and the file printing method includes: storing, in the first image forming apparatus, print management information about all image forming apparatuses in which a print file input by a user is temporarily saved; the print management information including print data management information of specifying, for each of users, the first or second image forming apparatus in which the print file input by the user is temporarily saved, and user use frequency information including a use count of the user who uses the first and second image forming apparatuses for each of the image forming apparatuses; temporarily saving, in the first image forming apparatus, the print file input by the user; confirming a use frequency of a given user for each of the image forming apparatuses by using the user use frequency information; selecting a second image forming apparatus that satisfies a predetermined movement condition by using the confirmed use frequency for each of the image forming apparatuses, moving, to the selected second image forming apparatus, the print file temporarily saved in the first image forming apparatus, and in a case where any image forming apparatus acquires the print data management information from the first image forming apparatus and uses the print data management information to select a print file desired to be printed and input a print request of the selected print file, when the selected print file is temporarily saved in a different image forming apparatus, acquiring the selected print file from the different image forming apparatus in which the selected print file is temporarily saved and then printing information of the acquired print file on a sheet by the any image forming apparatus, or when the selected print file is temporarily saved in the any image forming apparatus in which the print request is input, reading out information of the selected print file and printing the information on a sheet by the any image forming apparatus.

BRIEF DESCRIPTION OF THE DRAWINGS

FIGS. 4A to 4D are explanatory views of an exemplary embodiment of information used in an image forming apparatus of the disclosure;

DESCRIPTION OF THE EMBODIMENTS

Embodiments of the disclosure will be described below with reference to drawings. Note that, the disclosure is not limited by the description of exemplary embodiments below.

<Configuration of Image Processing System>

Figure 1:
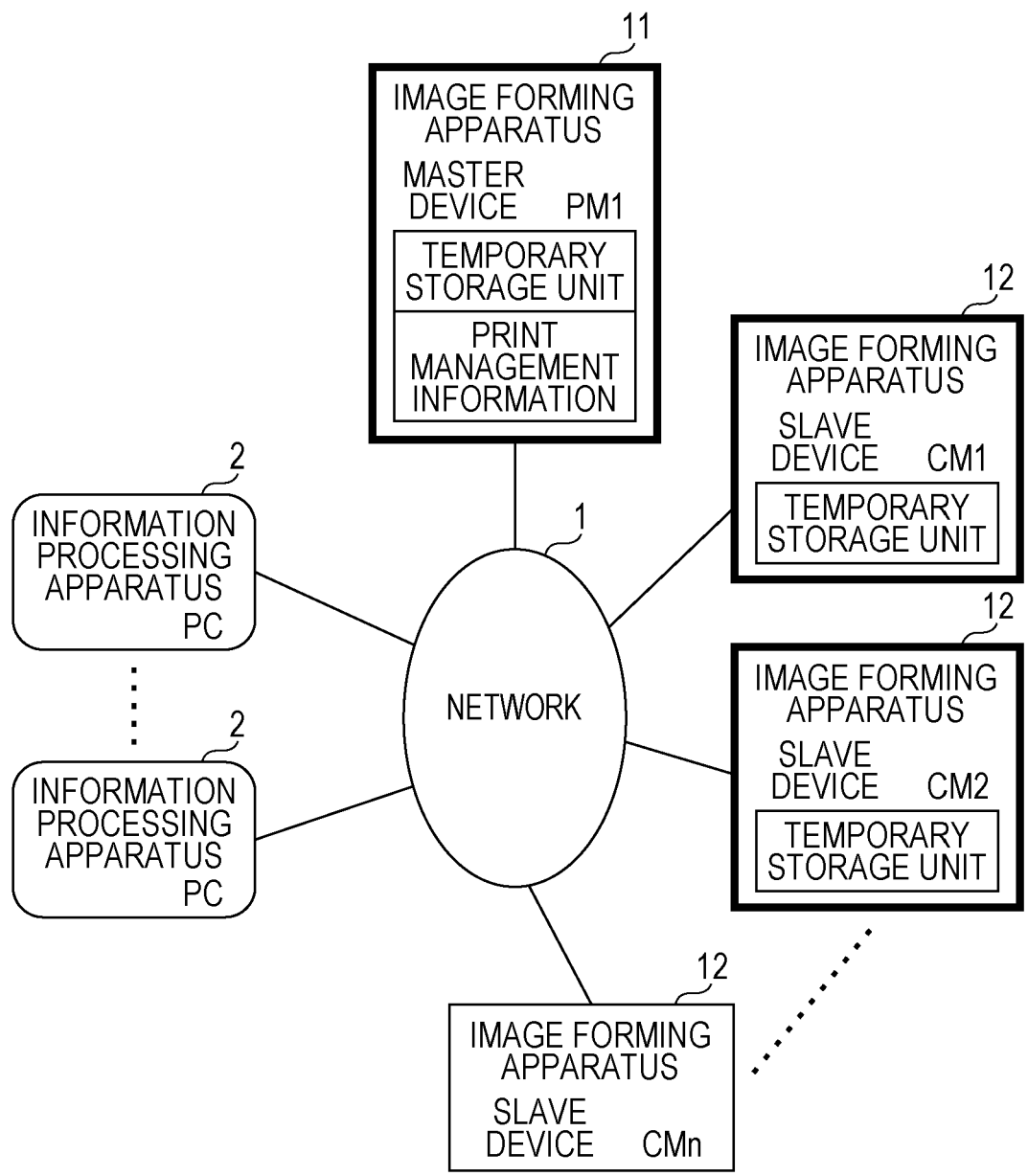
FIG. 1 is a schematic connection diagram of an exemplary embodiment of an image processing system of the disclosure.

FIG. 1 is a schematic connection diagram of an exemplary embodiment of an image processing system of the disclosure.

In FIG. 1, the image processing system of the disclosure is constituted by information processing apparatuses 2 and image forming apparatuses (11, 12) that are connected through a network 1. The image forming apparatuses include one master device 11 (PM1) and one or more slave devices 12 (CM1 to CMn) as described below, and are connected to each other by the network 1.

As the network 1, any wired or wireless network that is currently usable may be used and an example thereof includes a local area network (LAN) or a wide area network such as the Internet.

For example, a plurality of image forming apparatuses and a plurality of information processing apparatuses (PCs) 2 that are arranged in the same premise are connected through the local area network (LAN) 1.

The information processing apparatuses (hereinafter, also called PCs) 2 are electronic equipment such as personal computers, tablet terminals, smartphones, or other mobile terminals. In the disclosure, the information processing apparatuses 2 will be described mainly as apparatuses that create image information constituted by an image, a character, or the like and transmit the image information to an image forming apparatus.

The image forming apparatuses are apparatuses that process image information and have at least a function of printing image information constituted by an image, a character, or the like on a sheet. Examples thereof include printers having a print function or multifunction peripherals (MFPs) having a copy function, a print function, a scanner function, a FAX function, a communication function, and the like.

In the disclosure, the image forming apparatuses are classified into two types of a master device 11 (hereinafter, also called a PM1) and a slave device 12 (hereinafter, also called a CM).

The master device 11 corresponds to the first image forming apparatus described above and the slave device 12 corresponds to the second image forming apparatus described above.

The master device 11 (PM1) is an image forming apparatus that has a function of printing image information on a sheet and includes a temporary storage unit which temporarily saves image information transmitted from an information processing apparatus PC or image information input in the master device PM1 or another image forming apparatus, and print management information in which information of specifying an image forming apparatus in which a print file is saved, and information indicating a use frequency for each user, a current remaining capacity of an image forming apparatus, or the like are stored. Among the plurality of image forming apparatuses connected to the network, one image forming apparatus is initially set as the master device PM1 in advance. Any image forming apparatus may be used as the master device PM1, but an image forming apparatus whose maximum storage capacity is large is desired to be set as the master device PM1 in order to provide a temporary storage unit having a capacity as large as possible.

The temporary storage unit corresponds to a part of a storage unit of the master device PM1 and is able to store a plurality of pieces of image information up to a given maximum storage capacity. As described below, a file of image information saved in the temporary storage unit is called a saved file. In a case where print processing is executed, for example, a saved file stored in the temporary storage unit is read out and printed on a given sheet, and then, the saved file that is printed is deleted from the temporary storage unit.

The print management information includes print data management information, user use frequency information, use frequency determination information, and remaining capacity determination information as described below.

The slave device 12 (CM) is an image forming apparatus that has a function of printing image information on a sheet and includes a temporary storage unit that temporarily saves image information transmitted from an information processing apparatus PC or image information input in the master device PM1 or another image forming apparatus.

However, as described below, in a case where a file movement request transmitted from the master device PM1 is received, image information transmitted from the master device PM1 is temporarily saved in the temporary storage unit of the slave device CM.

For example, in a case where a print file of a given user, which is temporarily saved in the master device PM1, satisfies a predetermined movement condition considering a use frequency of the user, the print file is moved to a slave device CM that is frequently used by the user, and image information transmitted from the master device PM1 is temporarily saved in the temporary storage unit of the slave device CM.

Alternatively, in a case where a remaining capacity of the temporary storage unit of the master device PM1 is less than a given remaining capacity or a case where the remaining capacity of the own temporary storage unit of the slave device CM is larger than the remaining capacity of the temporary storage unit of the master device PM1, the image information transmitted from the master device PM1 may be temporarily saved in the temporary storage unit of the slave device CM.

That is, the temporary storage unit of the slave device CM is used as a preliminary storage unit for the master device PM1, and when image information is stored in a distributed manner as much as possible and the image information is transferred particularly to the slave device CM that is considerably frequently used by the user, a time required for printing when the printing is executed in the slave device that is frequently used by the user is able to be shortened, and further, processing capability of the master device PM1 is prevented from being lowered. In the disclosure, it is assumed that among the plurality of image forming apparatuses that are connected to the network, all the image forming apparatuses excluding the master device PM1 are set as slave devices CM in advance.

Both the master device PM1 and the slave device CM are image forming apparatuses and thus may be image forming apparatuses of the same model. In this case, type mode information may be stored as function setting information of the image forming apparatuses, and information meaning a "master device" may be initially set as the type mode information in the image forming apparatus that is used as the master device PM1. Moreover, in the image forming apparatus used as the slave device CM, information meaning a "slave device" may be initially set as the type mode information.

Alternatively, an image forming apparatus in which nothing is set as the type mode information may be set to function as a "slave device" in advance.

In the following exemplary embodiments, in principle, it is assumed that image information transmitted from an information processing apparatus PC to an image forming apparatus is a print file for printing, and except for a special case, such as a case where the master device PM1 malfunctions, the print file input by a user is temporarily saved as a saved file in the master device PM1 once. Additionally, in a case where a predetermined movement condition is satisfied, for example, such as a case where a use frequency at which a certain user uses a specific slave device CM is greater than a given frequency determination ratio or a case where the remaining capacity of the temporary storage unit of the master device PM1 is small, a print file temporarily saved in the master device PM1 is moved to any different slave device CM. Thus, in the disclosure, a print file for printing is saved in a distributed manner in the master device PM1 or any of one or more slave devices CM. In particular, on the basis of frequency information of each of users who use image forming apparatuses for the respective image forming apparatuses, the print file is saved in a distributed manner.

However, in a case where a print file created by the information processing apparatus PC of the user is to be transferred to the master device PM1, when the remaining capacity of the temporary storage unit of the master device PM1 is small, the print file created by the PC may not be saved in the maser device PM1 once but may be directly transferred from the information processing apparatus PC to a slave device CM that is most frequently used by the user. Alternatively, also in a case where there is a slave device CM in which a use frequency of the user is greater than a given determination number, the print file created by the PC may be directly transferred from the information processing apparatus PC to the slave device CM that is frequently used by the user.

Additionally, it is assumed that the user is able to select a desired print file and execute a print operation in both of the master device PM1 and the slave device CM.

After the user inputs a saving request to save a desired print file in the information processing apparatus PC of the user or any apparatus of the master device PM1 and the slave device CM, the user goes to any image forming apparatus in which print processing is to be executed among the master device PM1 and the slave device CM and inputs an operation to print the desired print file.

Since print management information of specifying an image forming apparatus in which a print file is saved is stored in the master device PM1, in any image forming apparatus to which the user inputs a print request, by using the print management information acquired from the master device PM1, the print file desired to be printed is acquired from the master device PM1 or the slave device CM in which the desired print file is saved, and then, printing is performed.

Thereby, even when the user does not know an image forming apparatus where the desired print file is temporarily saved, the user is able to output a sheet on which image information of the desired print file is printed in the image forming apparatus for which the print operation is performed.

<Explanation of Configuration of Image Forming Apparatus—Master Device PM1>

Figure 2:
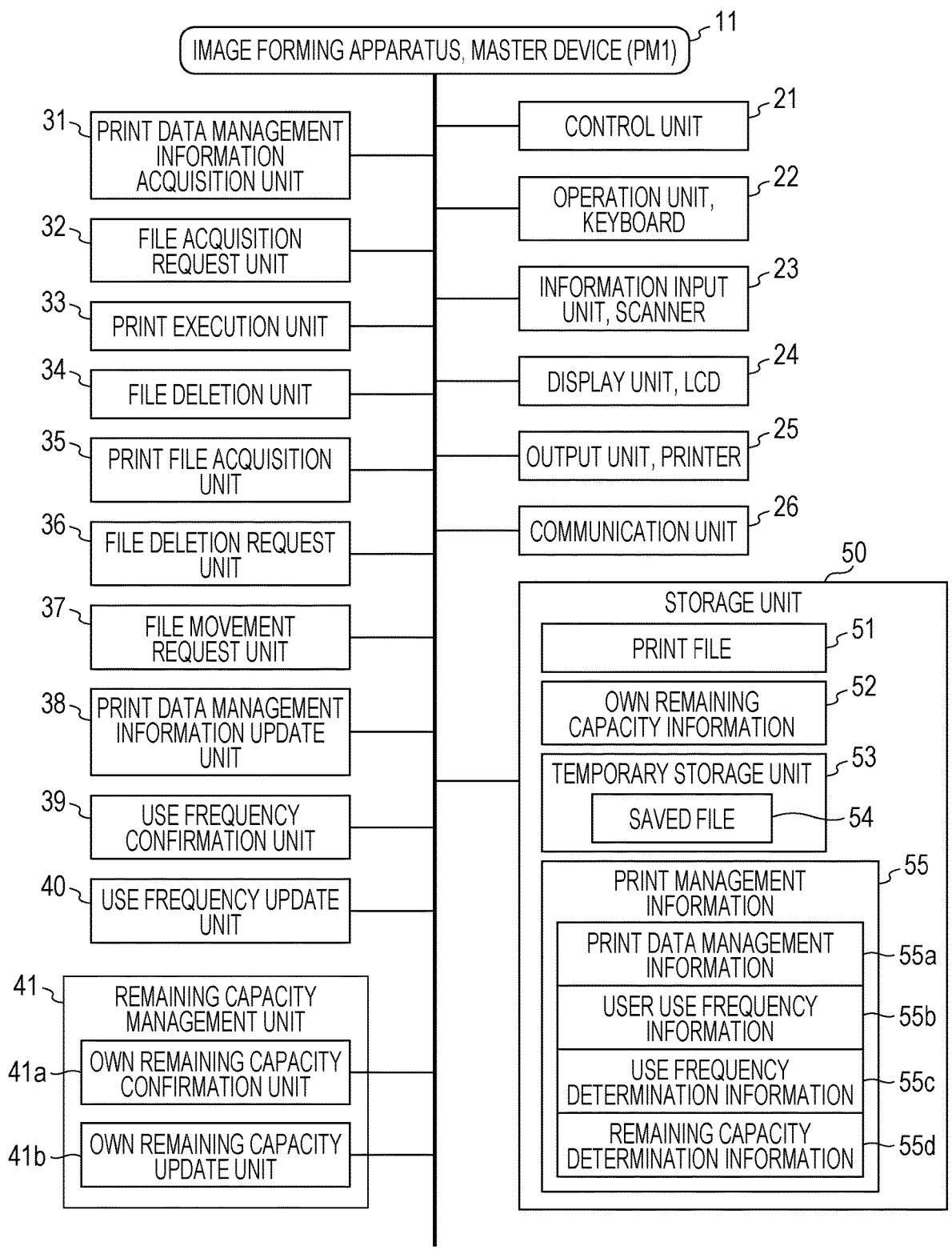
FIG. 2 is a structural block diagram of an exemplary embodiment of a master device of image forming apparatuses of the disclosure.

FIG. 2 is a structural block diagram of an exemplary embodiment of a master device of image forming apparatuses of the disclosure.

In FIG. 2, the master device 11 (PM1) among the image forming apparatuses of the disclosure mainly includes a control unit 21, an operation unit 22, an information input unit 23, a display unit 24, an output unit 25, a communication unit 26, a print data management information acquisition unit 31, a file acquisition request unit 32, a print execution unit 33, a file deletion unit 34, a print file acquisition unit 35, a file deletion request unit 36, a file movement request unit 37, a print data management information update unit 38, a use frequency confirmation unit 39, a use frequency update unit 40, a remaining capacity management unit 41, and a storage unit 50.

The control unit 21 is a part that controls operations of components such as the information input unit and is implemented by a microcomputer mainly constituted by a CPU, a ROM, a RAM, an I/O controller, a timer, and the like.

The CPU executes an information input function, a print function, and the like of the disclosure through organic operations of various types of hardware on the basis of a control program stored in the ROM or the like in advance.

The operation unit 22 is a part by which information of a character or the like is input or a function is selected and input, and a keyboard, a mouse, a touch panel, or the like is used therefor, for example.

The information input unit 23 is a part that inputs predetermined information and that inputs particularly a print file for printing. For example, the information input unit 23 inputs information of, for example, image data or a document in which a character, a figure, or the like is described. The information that is input is stored in the storage unit 50. In particular, information for printing is stored as a print file.

The information input unit 23 corresponds to a scanner that reads image data, or an interface by which an external storage medium such as a USB memory is connected.

Though there are various methods of inputting information of image data, a document, or the like, for example, a document on which information is printed is read by the scanner and electronic data of the document that is read is stored in the storage unit 50.

Additionally, an electronic data file of an image, a document, or the like that is to be input is saved in an external storage medium such as a USB memory, the USB memory or the like is connected to an input interface such as a USB terminal, and a given input operation is performed by the operation unit 22, so that a desired electronic data file saved in the USB memory or the like is read out and stored in the storage unit 50.

The method of inputting information of an image, a document, or the like is not limited to the aforementioned method and an electronic data file may be received from an information processing apparatus 2, a server, or the like through a LAN 10.

The display unit 24 is a part displaying information and displays information used for execution of each of functions, a result of execution of the function, or the like in order to inform the user. For example, an LCD, an organic EL display, or the like is used, and in a case where the touch panel is used as the operation unit 22, the touch panel is arranged in an overlaid state on the display unit.

The output unit 25 is a part outputting information and corresponds to, for example, a printer that prints the information on a paper medium for output. The output unit 25 may output the information to an external storage medium such as a USB memory.

The communication unit 26 is a part that is connected to the network 1 to exchange information with another image forming apparatus connected to the network and exchanges request information or response information with the information processing apparatus PC or another mage forming apparatus (slave device CM).

For example, in the information processing apparatus (PC) 2, when a user creates image information constituted by an image, a character, or the like and inputs a saving request of the image information to print the image information, the saving request including the image information is transmitted to the network, and when the saving request including the image information is received by the communication unit 26 of the master device PM1, the image information is temporarily saved as a saved file in the temporary storage unit of the master device PM1.

Any of communication schemes based on existing standards may be used and wired communication or wireless communication may be used.

The print data management information acquisition unit 31 is a part that acquires print data management information stored in the storage unit 50 of the master device PM1. In the master device PM1, the acquisition corresponds to reading-out of the print data management information stored in the own storage unit 50 of the master device PM1. The print data management information is information of specifying, for each of users, an image forming apparatus in which a print file that is input by the user is temporarily saved. In the print data management information, as illustrated in FIG. 4A described below, a file name of a saved file, a name of a user performing a saving operation, and information of specifying a saving apparatus are stored in association with each other. The print data management information that is read out is used for the user to select a desired saved file to be printed.

The file acquisition request unit 32 is a part that acquires a print file, which is saved in a different image forming apparatus, from the different image forming apparatus by the communication unit 26 and exchanges an acquisition request or an acquisition response for a given saved file with the different image forming apparatus.

The file acquisition request unit 32 performs, for example, processing of transmitting a file acquisition request to an image forming apparatus in which the given saved file is saved and processing of receiving a file acquisition response which is transmitted from the image forming apparatus and to which the given saved file is attached. The saved file attached to the file acquisition response that is received is stored in the storage unit 50 as a print file. Moreover, in a case where a file acquisition request is received from a different image forming apparatus, a saved file stored in the own storage unit 50 of the image forming apparatus is read out, and a file acquisition response to which the saved file that is read out is attached is transmitted to the different image forming apparatus from which the acquisition request is given.

The print execution unit 33 is a part that prints information of a print file stored in the storage unit 50 on a sheet, and the sheet on which the information is printed is output from the output unit 25.

In the disclosure, in any image forming apparatus among the image forming apparatuses including the maser device PM1, print management information (particularly, print data management information) is acquired from the master device PM1, and when the print management information is used to select a print file desired to be printed and input a print request of the selected print file, the selected print file is acquired by the file acquisition request unit 32 from the master device PM1 or the slave device CM in which the selected print file is currently saved, and information of the selected print file is printed on a sheet by the print execution unit 33 of the aforementioned any image forming apparatus.

The file deletion unit 34 is a part that deletes a saved file temporarily saved in the own storage unit of the master device PM1. For example, in a case where, after information of the print file selected by the user is printed on the sheet by the print execution unit 33, the selected print file is temporarily saved in the storage unit of the maser device PM1, the file deletion unit 34 of the master device PM1 deletes the selected print file from the storage unit 50. Thereby, the remaining capacity of the storage unit 50 is increased. Note that, in a case where setting meaning that the print file is not deleted after printing of the print file is completed is performed, the deletion of the print file is not executed.

The print file acquisition unit 35 is a part that acquires (reads out) a print file stored in the storage unit 50. The print file that is read out is provided to the print execution unit 33 and printed.

In a case where a file to be printed is a saved file that has been already saved in the temporary storage unit of the own storage unit of the master device PM1, the saved file is acquired as the print file.

The functional blocks from the control unit to the print file acquisition unit described above are also provided in other image forming apparatuses (slave devices CM) in addition to the master device PM1.

The file deletion request unit 36 is a part that requests the slave device CM to delete the saved file temporarily saved in the slave device CM. The file deletion request is performed after printing of the saved file is completed, and the file deletion request includes information indicating the saved file to be deleted.

For example, in a case where, after information of the print file selected by the user is printed on the sheet by the print execution unit 33, the selected print file is not temporarily saved in the maser device PM1, the file deletion request unit 36 requests the slave device CM, in which the selected print file is temporarily saved, to delete the print file that is temporarily saved. After that, the file deletion unit of the slave device CM in which the selected print file is temporarily saved deletes the selected print file.

Moreover, since the slave device CM receiving the file deletion request deletes the saved file and then transmits, to the master device PM1, a file deletion response (completion notification) indicating that the saved file is deleted, the file deletion request unit 36 receives the file deletion response (completion notification) and confirms that the saved file is actually deleted. The file deletion request unit 36 is a functional block provided in the master device PM1.

The file movement request unit 37 is a part moving a print file temporarily saved in the storage unit 50 of the master device PM1 to the slave device CM as another image forming apparatus, and transmits, to the slave device CM, a file movement request to request movement of the print file. A saved file to be temporarily saved in the slave device CM is attached to the file movement request. In a case where a predetermined condition as described below is satisfied, the file movement request unit 37 transmits the file movement request to the slave device CM that satisfies the condition and moves the print file, which is temporarily saved in the master device PM1, to the slave device CM.

Here, the movement of the print file means processing associated with deletion of the print file at an original storage location. For example, in a case where the print file temporarily saved in the mater device PM1 is moved to the slave device CM, the print file is saved in the slave device CM as a movement destination and the print file in the master device PM1 as a movement source is deleted. In a case where setting not to delete the print file is performed in advance in the image forming apparatus as the movement source, however, the print file to be moved is transferred to the image forming apparatus as the movement destination and the print file to be moved is not deleted in the image forming apparatus as the movement source.

Moreover, after the slave device CM receiving the file movement request saves the saved file, a file movement response (saving completion notification) is transmitted from the slave device CM, so that the file movement request unit 37 receives the file movement response (saving completion notification) and confirms that the saved file is actually saved. The file movement request unit 37 is a functional block provided only in the master device PM1.

The print data management information update unit 38 is a part that updates print data management information stored in the storage unit 50.

For example, after the saved file saved in the temporary storage unit of the storage unit 50 of the master device PM1 is printed, the saved file is deleted from the storage unit 50, so that information of the saved file also needs to be deleted from the print data management information in which the information of the saved file that is currently saved is stored. Thus, after the saved file is printed, update processing of deleting the information of the saved file from the print data management information is performed.

Additionally, in a case where a saved file is newly saved in the temporary storage unit of the storage unit 50 of the master device PM1, update processing of adding, to the print data management information, information indicating that the saved file is saved in the master device PM1. Further, also in a case where a new saved file is saved in the slave device CM or a case where the saved file saved in the slave device CM is deleted, the update processing of the print data management information is performed similarly.

The print data management information update unit 38 is a functional block provided in the master device PM1.

The use frequency confirmation unit 39 is a part that confirms a use frequency of a given user for image forming apparatuses that have been used by the user.

The confirmation of the use frequency is performed by using user use frequency information stored in the storage unit 50.

As illustrated in FIG. 4B described below, in the user use frequency information, for example, for each of users who have used image forming apparatuses, a user name UN, a total use count AM that is a sum of use counts of all the image forming apparatuses that have been used by the user, used apparatus information HM of identifying an image forming apparatus that has been used by the user, and a use count CT for the image forming apparatus that has been used by the user are stored in association with each other.

In addition, the use frequency confirmation unit 39 selects one image forming apparatus that satisfies a predetermined movement condition by using the confirmed use frequency for each of the image forming apparatuses. After that, the file movement request unit 37 described above moves the print file, which is temporarily saved in the storage unit 50, to the selected image forming apparatus. Though the predetermined movement condition is described below, an image forming apparatus that satisfies the following movement condition is selected, for example.

In the confirmation of the use frequency, use counts of the image forming apparatuses that have been used by the user are confirmed, and an image forming apparatus that is most frequently used is selected, for example, from among the image forming apparatuses that have been used by the user. The image forming apparatus that is most frequently used serves as a candidate of an apparatus to which a print file input by the user through a PC or the like is moved.

Alternatively, a use count of the user for an image forming apparatus may be compared to a transfer determination number T0 that is stored in advance in the storage unit 50 as described below, and whether or not the use count of the image forming apparatus exceeds the transfer determination number T0 may be confirmed. In a case where the use count of the image forming apparatus exceeds the transfer determination number T0, the image forming apparatus is selected and serves as a candidate of an apparatus to which the print file of the user is moved from the master device PM1.

A frequency determination ratio N0 used to determine whether or not to move the print file that is temporarily saved to another image forming apparatus may be stored in advance in the storage unit 50, and on the basis of the total use count AM of a given user and the use counts CT of the image forming apparatuses that have been used by the user, which are stored in the user use frequency information, the use frequency confirmation unit 39 may calculate use frequency ratios FR of the user for the image forming apparatuses. In this case, the respective use frequency ratios FR that are calculated are compared to the frequency determination ratio N0 that is stored in advance in the storage unit 50, and an image forming apparatus having the greatest use frequency ratio FR is selected from among the image forming apparatuses having the use frequency ratios FR greater than the frequency determination ratio N0 and serves as a candidate of an apparatus to which a print file of the user is moved from the master device PM1.

The use frequency update unit 40 is a part that updates the user use frequency information stored in the storage unit 50.

For example, in a case where a given user US01 performs print processing for the first time in a specific slave device CM1, in user use frequency information for the user US01, the slave device CM1 is newly registered as the used apparatus information HM and 1 is stored as the use count CT of the slave device CM1.

Moreover, in a case where the given user US01 performs print processing in a slave device CM2, when the slave device CM2 has been already registered as the used apparatus information HM of the user use frequency information for the user US01, 1 is added to the use count CT of the slave device CM2. Additionally, in both cases, 1 is added to the total use count AM of the user.

The remaining capacity management unit 41 is a part that manages a remaining storage capacity (hereinafter, also called a remaining capacity) of the storage unit 50, that is, an available capacity usable as the temporary storage unit. The remaining capacity management unit 41 manages at least the remaining capacity of the own storage unit of the master device PM1.

Alternatively, the remaining capacity management unit 41 may manage remaining capacities of storage units of all slave devices CM. In this case, a remaining capacity list in which remaining capacities of the master device PM1 and the slave devices CM are stored is stored in the storage unit 50. The remaining capacities of the master device PM1 and the slave device CM are confirmed, the remaining capacity list is updated, and the remaining capacity of the master device PM1 and the remaining capacity of the slave device CM are compared.

The remaining capacity management unit 41 mainly includes an own remaining capacity confirmation unit 41a and an own remaining capacity update unit 41b. Alternatively, in a case of managing the remaining capacity of the storage unit of the slave device CM, the remaining capacity management unit 41 may include a remaining capacity confirmation request unit, a remaining capacity list update unit, a remaining capacity list confirmation unit, and a remaining capacity comparison unit, in addition to the aforementioned components.

The own remaining capacity confirmation unit 41a is a part that confirms the remaining capacity (own remaining capacity information) of the own storage unit 50 of the image forming apparatus, and the remaining capacity is calculated, for example, by subtracting processing of subtracting a storage capacity that is currently used from a maximum storage capacity of the storage unit 50. The remaining capacity changes as a saved file is added to or deleted from the temporary storage unit of the storage unit of the image forming apparatus.

The own remaining capacity confirmation unit 41a also compares own remaining capacity information RC of the master device PM1 that is confirmed to remaining capacity determination information R0 that is stored in advance in the storage unit 50. In a case where the own remaining capacity information RC is smaller than given remaining capacity determination information R0 as a result of the comparison (RC<R0), it is determined that the storage capacity of the master device PM1 is very small and the use frequency confirmation unit 39 selects one image forming apparatus (slave device) that satisfies a predetermined movement condition. To the selected slave device that satisfies the movement condition related to the use frequency, the saved file saved in the temporary storage unit of the master device PM1 is moved.

Note that, in a case where the condition of the remaining capacity as described above is satisfied, the saved file saved in the temporary storage unit of the master device PM1 may be moved to another image forming apparatus (slave device), for example, to a slave device whose remaining capacity is greater than that of the master device PM1 without considering the movement condition related to the use frequency.

The own remaining capacity update unit 41b is a part that updates own remaining capacity information stored in the master device PM1. In a case where the current remaining capacity of the master device PM1 changes as the saved file is added to or deleted from the master device PM1, a content of the own remaining capacity information is updated.

The remaining capacity confirmation request unit is a part that requests a different image forming apparatus to confirm the remaining capacity and requests to notify the master device PM1 of the current remaining capacity of the different image forming apparatus. For example, the master device PM1 transmits a remaining capacity confirmation request to the slave device CM as a movement destination of the saved file. Moreover, the remaining capacity confirmation request unit receives a remaining capacity confirmation response transmitted form the slave device CM. The remaining capacity confirmation response includes the current remaining capacity of the slave device CM.

The remaining capacity list update unit is a part that updates the remaining capacity list stored in the master device PM1. In a case where the saved file is added to or deleted from the master device PM1 or the slave device CM so that the current remaining capacity of the master device PM1 or the slave device CM changes, the remaining capacity list update unit updates a content of the remaining capacity list. For example, by using the current remaining capacity of the slave device CM included in the remaining capacity confirmation response described above, the remaining capacity list update unit changes the remaining capacity of the slave device CM in the remaining capacity list.

The remaining capacity list confirmation unit is a part that reads out the remaining capacity list stored in the master device PM1. The remaining capacity list confirmation unit reads out remaining capacities of all image forming apparatuses, which are stored in the remaining capacity list, mainly for comparison of the remaining capacities.

The remaining capacity comparison unit is a part that compares the remaining capacities of all the image forming apparatuses, which are stored in the remaining capacity list. That is, the remaining capacity comparison unit compares the remaining capacity of the storage unit of the master device PM1 to remaining capacities of storage units of a plurality of slave devices CM. An image forming apparatus whose remaining capacity is the largest is found by the comparison. The comparison is performed to determine an image forming apparatus in which the print file that is requested to be saved by the user is to be saved.

For example, in a case where the master device PM1 among the master device PM1 and the plurality of slave devices CM has the largest remaining capacity, the print file that is requested to be saved is saved in the master device PM1.

In a case where a specific slave device CM among the master device PM1 and the plurality of slave devices CM has the largest remaining capacity, the print file that is requested to be saved is saved in the specific slave device CM. In this case, since the print file that is requested to be saved by the user is temporarily saved in the master device PM1, the print file is moved to the specific slave device CM and the print file temporarily saved in the master device PM1 is deleted.

The storage unit 50 is a part storing information or a program used for executing functions of the image forming apparatus of the disclosure, and particularly saves a print file that is input by the information input unit in the disclosure.

As the storage unit 50, a semiconductor storage element such as a ROM, a RAM, or a flash memory, a storage device such as HDD or SSD, or other storage media is used.

In the storage unit 50, for example, a print file 51, own remaining capacity information 52, a temporary storage unit 53, print management information 55, and the like are stored.

Here, the temporary storage unit 53 is a part that temporarily stores a saved file 54 received or input for printing.

The print management information 55 is a part that stores information about all image forming apparatuses, including the master device PM1 and the slave device CM, in which the print file input by the user is currently temporarily saved. For example, print data management information 55a, user use frequency information 55b, use frequency determination information 55c, and remaining capacity determination information 55d are stored in the print management information 55. Moreover, the own remaining capacity information 52 and the remaining capacity determination information 55d correspond to remaining capacity management information, and the remaining capacity management information also includes the remaining capacity list described above.

The print file 51 means a file that is actually printed by the print execution unit 33. For example, in a case where a file requested to be printed is a saved file saved in the temporary storage unit of the master device PM1, the saved file saved in the temporary storage unit of the master device PM1 is the print file. Moreover, in a case where a file requested to be printed is a saved file saved in the temporary storage unit of the slave device CM, the saved file acquired from the slave device CM is the print file.

The own remaining capacity information 52 is information indicating the remaining capacity of the own storage unit of the image forming apparatus.

In a case of the master device PM1, the own remaining capacity information 52 is information indicating the remaining capacity of the master device PM1. The current remaining capacity is calculated by the own remaining capacity confirmation unit 41a described above and stored as the own remaining capacity information 52. Additionally, in a case where the own remaining capacity of the master device PM1 changes, the own remaining capacity information 52 of the master device PM1 is updated by the own remaining capacity update unit 41b.

The own remaining capacity information 52 means an available capacity that is currently not used in the maximum storage capacity of the storage unit 50 of the master device PM1. Note that, in a case where a storage region of the temporary storage unit 53 in which a saved file for printing is temporarily stored is fixedly secured in advance and a maximum storage capacity of the temporary storage unit 53 is decided, an available capacity of the temporary storage unit 53 may be stored as the own remaining capacity information 52.

The own remaining capacity information is stored in the master device PM1 and the slave device CM.

The temporary storage unit 53 means a region in which a print file that is requested to be saved by the user for printing and that is input by the information input unit 23 or received by the communication unit 26 is temporarily saved. The file saved in the temporary storage unit 53 is called the saved file 54.

One or more saved files 54 are saved in the temporary storage unit 53, and such saving is kept, in principle, until the saved file 54 is printed, and in a case where printing of the saved file 54 is completed in any image forming apparatus, the saved file is deleted. In a case where setting not to perform deletion is performed, however, the saved file is not deleted. The temporary storage unit 53 is provided in the master device PM1 and the slave device CM.

As described above, the print management information 55 is information in which information about all image forming apparatuses in which the print file input in the image forming apparatus is currently temporarily saved is stored. Identification information of an image forming apparatus, identification information of a user, information of specifying a saved file saved in the image forming apparatus, saving apparatus information, a use frequency of each user, a remaining capacity of the image forming apparatus, and the like are mainly stored in association with each other.

The print management information 55 is information stored only in the master device PM1.

It is desired that the master device PM1 is connected to an image forming apparatus in which a saved file is able to be saved, acquires predetermined information, and initially sets the print data management information 55a or the like in advance.

FIGS. 4A to 4D are explanatory views of an exemplary embodiment of information used in the image forming apparatus of the disclosure. Here, in particular, the print management information 55 constituted by the print data management information 55a, the user use frequency information 55b, the use frequency determination information 55c, and the remaining capacity determination information 55d will be described.

FIG. 4A is an explanatory view of an exemplary embodiment of the print data management information 55a.

The print data management information 55a is a list in which for each of users using the image forming apparatuses and for each of all the image forming apparatuses in which a saved file is able to be saved, information of specifying the saved file that is currently temporarily saved in storage units thereof is stored.

As illustrated in FIG. 4A, for example, a name (file name: FN) of a saved file, identification information (user name: UN) of a user, and identification information (saving apparatus information: HM) of an image forming apparatus in which the saved file is temporarily saved are stored in association with each other. Note that, information to be stored may not be the name itself of the saved file and may be information by which each saved file is able to be uniquely specified and an image forming apparatus in which the saved file is saved is able to be uniquely specified.

In order to transmit information from the master device PM1 to the slave device CM, as information of the slave device CM, for example, an IP address or a MAC address of the slave device CM may be stored in addition to the identification information (HM). Though FIG. 4A illustrates that the information is arranged in order of the file name FN, the information may be arranged for each user name UN or arranged for each saving apparatus information HM. Additionally, in a case where a saved file of a certain user needs to be confirmed, searching may be performed with a user name UN and the saved file with the user name UN may be extracted.

In FIG. 4A, for example, FL01 as the saved file name (FN), US01 as the user name (UN), and identification information PM1 of the master device as the saving apparatus information (HM) are stored in association with each other, which indicates that the saved file that has a name of FL01 and is created by the user with US01 as the identification information is currently saved in the master device PM1 having PM1 as the identification information ID.

Moreover, FL02 as the saved file name (FN), US01 as the user name (UN), and CM1 as the identification information (HM) of the slave device CM are stored in association with each other, which indicates that the saved file that has a name of FL02 and is created by the user with US01 as the identification information is currently saved in the slave device CM1 having CM1 as the identification information ID. Also for another user (such as US03), similarly, a saved file name (FN) and identification information (HM) of an image forming apparatus in which the saved file is stored are stored in associated with each other.

It is desired that, for example, when the master device PM1 is initially set or when a new slave device CM is connected to the network, the slave device CM connected to the network is searched for, a file name of a saved file saved in the slave device CM and a user name are acquired from the slave device CM that is found, and the saved file name (FN), the user name (UN), and the identification information (HM) of the slave device CM are stored in advance in association with each other in the print data management information 55a.

The print data management information 55a is mainly used to detect an image forming apparatus in which a print file is temporarily saved.

For example, in any image forming apparatus, the print data management information 55a acquired from the master device PM1 is used to detect an image forming apparatus in which a print file selected by the user is temporarily saved, and when the detected image forming apparatus is a different slave device CM, the file acquisition request unit 32 of the any image forming apparatus acquires, from the different slave device CM, the selected print file.

The user use frequency information 55b is information that includes, for the user who uses the image forming apparatus serving as the master device and another image forming apparatus (slave device), use counts for the respective image forming apparatuses, and is information in which information particularly about a use frequency, such as a use count of the user for an image forming apparatus in which the user uses a print function or the like, is stored.

FIG. 4B is an explanatory view of an exemplary embodiment of the user use frequency information 55b. Here, the user use frequency information 55b constituted by a user name (UN), a total use count (AM), used apparatus information (HM), and a use count (CT) is indicated. The user name (UN) is the aforementioned identification information of the user.

The total use count (AM) is a total number of use counts for one or more image forming apparatuses used by the user. The total use count (AM) indicates a numerical value obtained by totaling the use counts (CT) for the respective image forming apparatuses that have been used by one user. The used apparatus information (HM) is information of specifying an image forming apparatus used by the user.

The use count (CT) is the number of times of usage of each of the image forming apparatuses used by the user. That is, the use count (CT) is a use count obtained by totaling for each of the image forming apparatuses. A multifunction peripheral that is an image forming apparatus has various functions, and, for example, in a case where a user uses a print function in the multifunction peripheral, 1 is added to the use count (CT) of the multifunction peripheral corresponding to a user name (UN) of the user. Alternatively, in a case where a multifunction peripheral has a copy function, a scanner function, a communication function, and the like, every time any one of the functions is executed by a user, 1 may be added to the use count (CT) of the multifunction peripheral corresponding to a user name (UN) of the user.

FIG. 4B illustrates the user use frequency information 55b for each of two users. For example, a user whose user name (UN) is US01 uses an image forming apparatus whose used apparatus information (HM) is PM1 four times, uses an image forming apparatus whose used apparatus information (HM) is CM1 fourteen times, and uses an image forming apparatus whose used apparatus information (HM) is CM2 twice, so that the total use count (AM) that is a total number of times of usage for all the image forming apparatuses is 4+14+2=20. Additionally, a user whose user name (UN) is US02 uses the image forming apparatus whose used apparatus information (HM) is PM1 three times, uses the image forming apparatus whose used apparatus information (HM) is CM1 three times, and uses an image forming apparatus whose used apparatus information (HM) is CM2 four times, so that the total use count (AM) that is a total number of times of usage for all the image forming apparatuses is 10.

Moreover, by using the total use count (AM) and the use count (CT), a use frequency ratio FR as described below is calculated for each of used apparatuses. The use frequency ratio FR (%) is calculated by (use count (CT)/total use count (AM))×100.

In FIG. 4B, for example, the use frequency ratio FR of the user US01 is calculated for each of the three used apparatuses, and the use frequency ratio FR of the image forming apparatus PM1 is 20% (=(4/20)×100), the use frequency ratio FR of the image forming apparatus CM1 is 70% (=(14/20)×100), and the use frequency ratio FR of the image forming apparatus CM2 is 10% (=(2/20)×100).

Note that, though frequency information of the image forming apparatuses that have been used is stored in the user use frequency information 55b of FIG. 4B, information (HM) of all the image forming apparatus usable by a user may be stored in advance and zero may be set in advance to the use count (CT) of an image forming apparatus that has not been used yet by the user.

The use frequency determination information 55c is information in which information serving as standard to determine a degree of a use frequency of the user for each of the image forming apparatuses is stored and which is related to a movement condition of a print file.

FIG. 4C is an explanatory view of an exemplary embodiment of the use frequency determination information 55c.

The use frequency determination information 55c illustrated in FIG. 4C is constituted by a frequency determination number M0, a frequency determination ratio N0, and determination validity/invalidity information H0.

The frequency determination number M0 is a numerical value to be compared to the total use count AM of the user. For example, in a case where the total use count AM of the user is greater than the frequency determination number M0 (AM>M0), the use frequency ratio FR of the user for each of the image forming apparatuses is calculated. In a case where the total use count AM of the user is greater than a given number M0, the use frequency ratio FR is calculated so that the number of samples by which the use frequency ratio FR is able to be determined to be statistically significant is able to be set in advance.

In the illustration of FIG. 4C, "9" is set as the frequency determination number M0. In this case, the use frequency ratio FR is calculated when the total use count AM of the user is 10 or more, but the use frequency ratio FR is not calculated when the total use count AM of the user is 9 or less. Note that, the numerical value of the frequency determination number M0 is not limited to "9". The numerical value of the frequency determination number M0 may be set in advance as a fixed value or may be changed to a desired numerical value by the user or a person in charge of management of the master device PM1.

The frequency determination ratio N0 is a numerical value to be compared to the use frequency ratio FR. For example, in a case where the use frequency ratio FR of a certain slave device CM is greater than the frequency determination ratio N0 (FR>N0), it is determined that the user very frequently uses the slave device CM, and a file that is requested to be saved by the user is moved from the master device PM1 to the slave device CM.

In the illustration of FIG. 4C, "50%" is set as the frequency determination ratio N0. In this case, when the use frequency ratio FR exceeds 50% (FR>N0), the file that is requested to be saved by the user is moved to a used apparatus corresponding to the use frequency ratio FR. On the other hand, when the use frequency ratios FR of all the used apparatuses are 50% or less (FR 5 N0), the file that is requested to be saved by the user is not moved and is saved in the master device PM1.

Note that, the numerical value of the frequency determination ratio N0 is not limited to "50%". The numerical value of the frequency determination ratio N0 may be set in advance as a fixed value or may be changed to a desired numerical value by the user or the person in charge of management of the master device PM1. Note that, in a case where a small numerical value such as 20% is set to the use frequency ratio FR and there are a plurality of used apparatuses whose use frequency ratio FR exceeds 20%, the file that is requested to be saved by the user may be moved to a used apparatus whose use frequency ratio FR is maximum.

The determination validity/invalidity information H0 is information of setting whether or not to perform determination using the use frequency determination information 55c as described above.

As illustrated in FIG. 4C, for example, valid (1) or invalid (0) is set to the determination validity/invalidity information H0. In a case where valid (1) is set to the determination validity/invalidity information H0, use frequency determination using the frequency determination number M0 and the frequency determination ratio N0 is performed. In a case where invalid (0) is set to the determination validity/invalidity information H0, the use frequency determination using the frequency determination number M0 and the frequency determination ratio N0 is not performed.

The use frequency determination information 55c is not limited to the foregoing. In addition, for example, a transfer determination number T0 may be used as the use frequency determination information 55c.

The transfer determination number T0 is a numerical value used to determine whether or not to transfer (or move) a saved file, which is temporarily saved in the master device PM1, to another image forming apparatus and is information stored in advance in the storage unit 50.

For example, 100 is set in advance to the transfer determination number T0, and in a case where the use count CT of the user US03 for a certain slave device CM3 (for example, the number of times of using the slave device CM3 for printing) is greater than the transfer determination number T0 (=100) (CT>T0), a saved file of the user US03 which is temporarily saved in the master device PM1 is transferred (or moved) from the master device PM1 to the slave device CM3. Moreover, in a case where there are a plurality of slave devices CM satisfying use count CT>transfer determination number T0, the saved file of the user US03 may be transferred (or moved) to a slave device CM whose use count CT is maximum.

In this case, since the slave device CM3 is an apparatus that has been already used by the user US03 very frequently, the user US03 is considered to be more likely to use the slave device CM3 in the future as well. Thus, by always transferring the saved file of the user US03 to the slave device CM3 that is frequently used, the file is not obtained from another image forming apparatus when printing is actually executed, and it is possible to shorten a substantial print time until a printed sheet is output after the user US03 performs a print execution operation in the slave device CM3.

FIG. 4D is an explanatory view of an exemplary embodiment of remaining capacity management information. The remaining capacity management information is constituted by the own remaining capacity information 52 (RC) and the remaining capacity determination information 55d (R0) as described above, and the aforementioned remaining capacity list may be stored in the remaining capacity management information.

FIG. 4D illustrates a case where the own remaining capacity information (RC) of the master device PM1 is 8 GB and the remaining capacity determination information (R0) is 10 GB. In this case, since the own remaining capacity information (RC) of the master device PM1 is smaller than the remaining capacity determination information (R0) (RC<R0), the storage capacity available in the master device PM1 is determined to be considerably small.

In a case where the storage capacity available in the master device PM1 is small, the master device PM1 has no margin to store a saved file and there is a possibility that a new saved file is not able to be saved, so that the saved file of the master device PM1 is moved to another slave device. The aforementioned user use frequency information is used to decide the slave device to which the saved file is moved.

On the other hand, in a case where the own remaining capacity information (RC) of the master device PM1 is greater than the remaining capacity determination information (R0), a new saved file may be temporarily stored in the master device PM1.

The remaining capacity list is a list in which, for each of all image forming apparatuses in which a saved file is able to be saved, a remaining capacity of a storage unit of each of the image forming apparatuses is stored. For example, for each of the master devices PM1 and a plurality of slave devices CM, identification information (HM) of each of the image forming apparatuses and a remaining capacity (RC) of the apparatus are stored in association with each other.

It is desired that when the master device PM1 is initially set and connected to the network, a slave device CM connected to the network is searched for, a remaining capacity of the slave device CM that is found is acquired from the slave device CM, and the remaining capacity of the slave device CM is stored in advance in the remaining capacity list. The remaining capacity of the master device PM1 itself is also stored in advance in the remaining capacity list.

Moreover, it may be set that when a new slave device CM is connected to the network, the new slave device CM is connected to the master device PM1, and a remaining capacity of the new slave device CM is transmitted to the master device PM1 and stored in the remaining capacity list. It may be also set that the master device PM1 periodically searches for a slave device CM that is connected to the network, acquires, from the slave device CM that is found, a remaining capacity of the slave device CM, and updates the remaining capacity list.

The configuration of the exemplary embodiment of the master device PM1 is as described above.

The master device PM1 includes, in particular, the communication unit 26 that exchanges information with a different image forming apparatus connected to a network, the storage unit 50 that temporarily saves a print file input for printing and stores the print data management information 55a in which information of specifying a print file temporarily saved in each of the master device PM1 and the different image forming apparatus is stored, the file acquisition request unit 32 that acquires, from the different image forming apparatus, by the communication unit 26, the print file saved in the different image forming apparatus, and the print execution unit 33 that prints information of a given print file on a sheet.

Further, a desired print file is selected by using the print data management information 55a in the master device PM1, and in a case where the selected print file is temporarily saved in a different image forming apparatus, after the file acquisition request unit 32 acquires the selected print file from the different image forming apparatus in which the selected print file is temporarily saved, or in a case where the selected print file is temporarily saved in the storage unit 50, after the selected print file is acquired from the storage unit 50, the print execution unit 33 prints information of the acquired print file on a sheet.

Thereby, since the print file is temporarily saved not only in the master device PM1 but also in the different image forming apparatus in a distributed manner, it is possible to avoid concentration of access to one master device PM1 during execution of printing and prevent processing capability of the master device PM1 form being lowered.

Moreover, by considering the use frequency of each user for an image forming apparatus or the remaining capacity of an image forming apparatus such as the master device PM1, a print file is saved in a plurality of image forming apparatuses in a distributed manner, and a print file of a user is moved particularly to an image forming apparatus that is frequently used by the user, so that it is possible to shorten a print time when the print file is printed in the image forming apparatus that is always frequently used by the user.
<Explanation of Configuration of Image Forming Apparatus—Slave Device CM>

Figure 3:
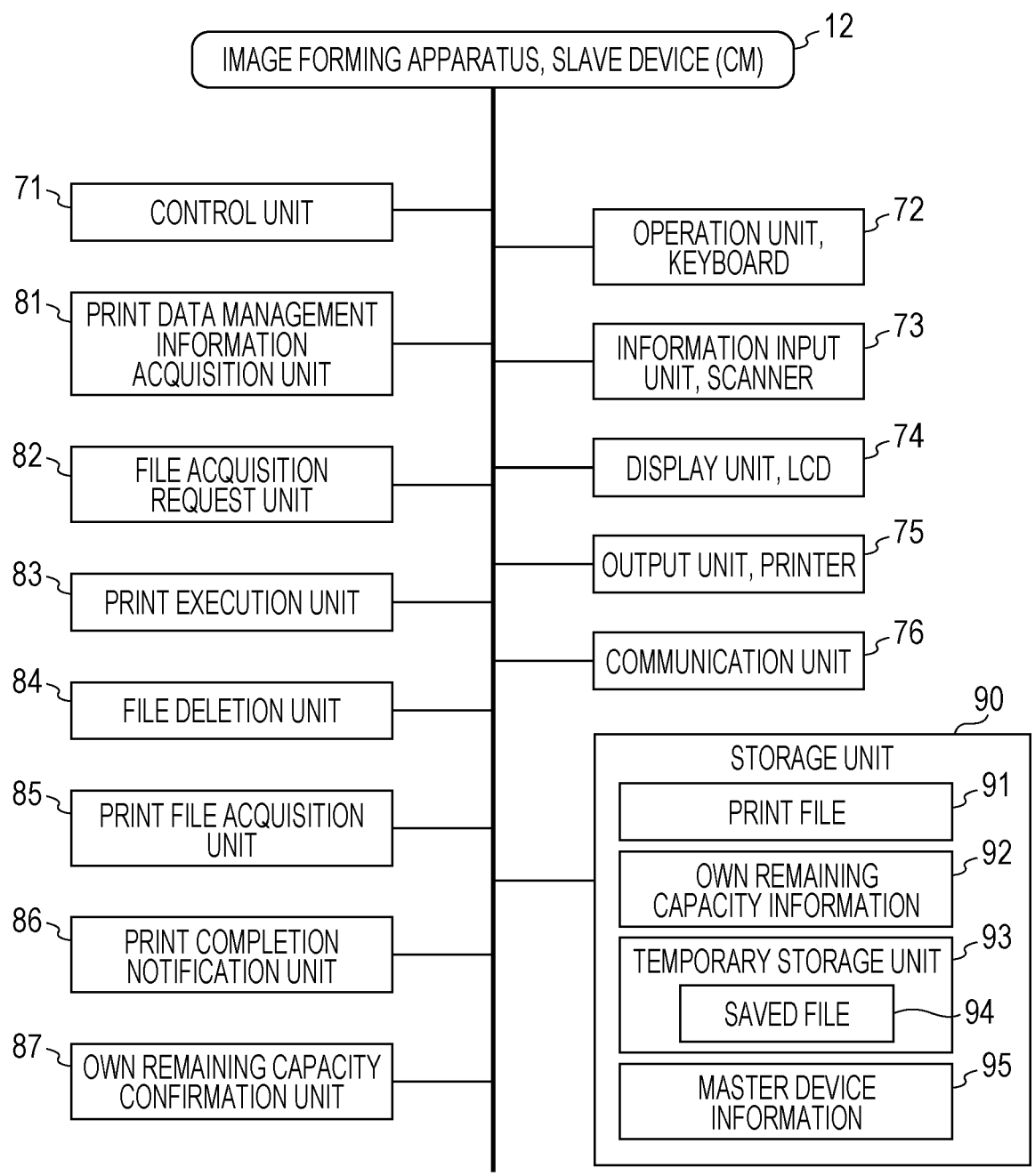
FIG. 3 is a structural block diagram of an exemplary embodiment of a slave device of the image forming apparatuses of the disclosure.

FIG. 3 is a structural block diagram of an exemplary embodiment of a slave device of the image forming apparatuses of the disclosure.

In FIG. 3, the slave device 12 (CM) among the image forming apparatuses of the disclosure mainly includes a control unit 71, an operation unit 72, an information input unit 73, a display unit 74, an output unit 75, a communication unit 76, a print data management information acquisition unit 81, a file acquisition request unit 82, a print execution unit 83, a file deletion unit 84, a print file acquisition unit 85, a print completion notification unit 86, an own remaining capacity confirmation unit 87, and a storage unit 90.

Since most operations of functional blocks (71 to 90) illustrated in FIG. 3 are almost similar to the operations of the functional blocks of the master device PM1 illustrated in FIG. 2, details thereof will be omitted and a different part will be described.

In the slave device CM, the print data management information acquisition unit 81 transmits a print data management information acquisition request to the master device PM1, and receives a print data management information acquisition response from the master device PM1. To the print data management information acquisition response, print data management information about a user requesting the print data management information out of the print data management information stored in the master device PM1 is attached. In the slave device CM, the print data management information that is received is displayed on the display unit 74, so that a saved file to be printed is selected by the user.

In the slave device CM, the print file acquisition unit 85 is a part that acquires (reads out) a print file stored in the own storage unit 90 of the slave device CM. The print file that is read out is provided to the print execution unit 83 and printed.

Moreover, in a case where the file to be printed is a saved file that has been already saved in a temporary storage unit of the own storage unit of the slave device CM, the saved file is acquired as the print file.

In the slave device CM, the print completion notification unit 86 is a part that notifies the master device PM1 of information (print completion notification) indicating that printing is completed after the print file is printed. The print completion notification includes a name of the print file that is printed, a user name of a user performing the printing, and information (used apparatus information) of the slave device CM performing the printing.

In the slave device CM, the own remaining capacity confirmation unit 87 is a part that confirms the remaining capacity of the own storage unit 90 of the slave device CM, and the remaining capacity is calculated, for example, by subtracting processing of subtracting a storage capacity that is currently used from a maximum storage capacity of the storage unit 90.

Though not illustrated, the slave device CM has a function of, in a case of receiving a remaining capacity confirmation request from the master device PM1, confirming the remaining capacity of the own storage unit 90 of the slave device CM by the own remaining capacity confirmation unit 87 and transmitting, to the master device PM1, a remaining capacity confirmation response including the current own remaining capacity that is calculated.

In the storage unit 90 of the slave device CM, for example, a print file 91, own remaining capacity information 92, a saved file 94 saved in a temporary storage unit 93, master device information 95, and the like are stored.

Here, in the temporary storage unit 93, the saved file 94 that is received by a movement request from the master device PM1 is stored, and saved until the saved file is printed, similarly to the master device PM1.

The master device information 95 is information of specifying the master device PM1 and is used to specify a transmission destination when information about a print data management information acquisition request, a file acquisition request, print completion notification, or the like is transmitted to the master device PM1. As the master device information 95, for example, an IP address or a MAC address of the master device PM1 is used.

Note that, information such as the print management information 55 of the master device PM1 is not stored in the slave device CM.

<Explanation of Sequence of Processing of Saving Print File>

Exemplary Embodiment 1 of Saving

Figure 5:
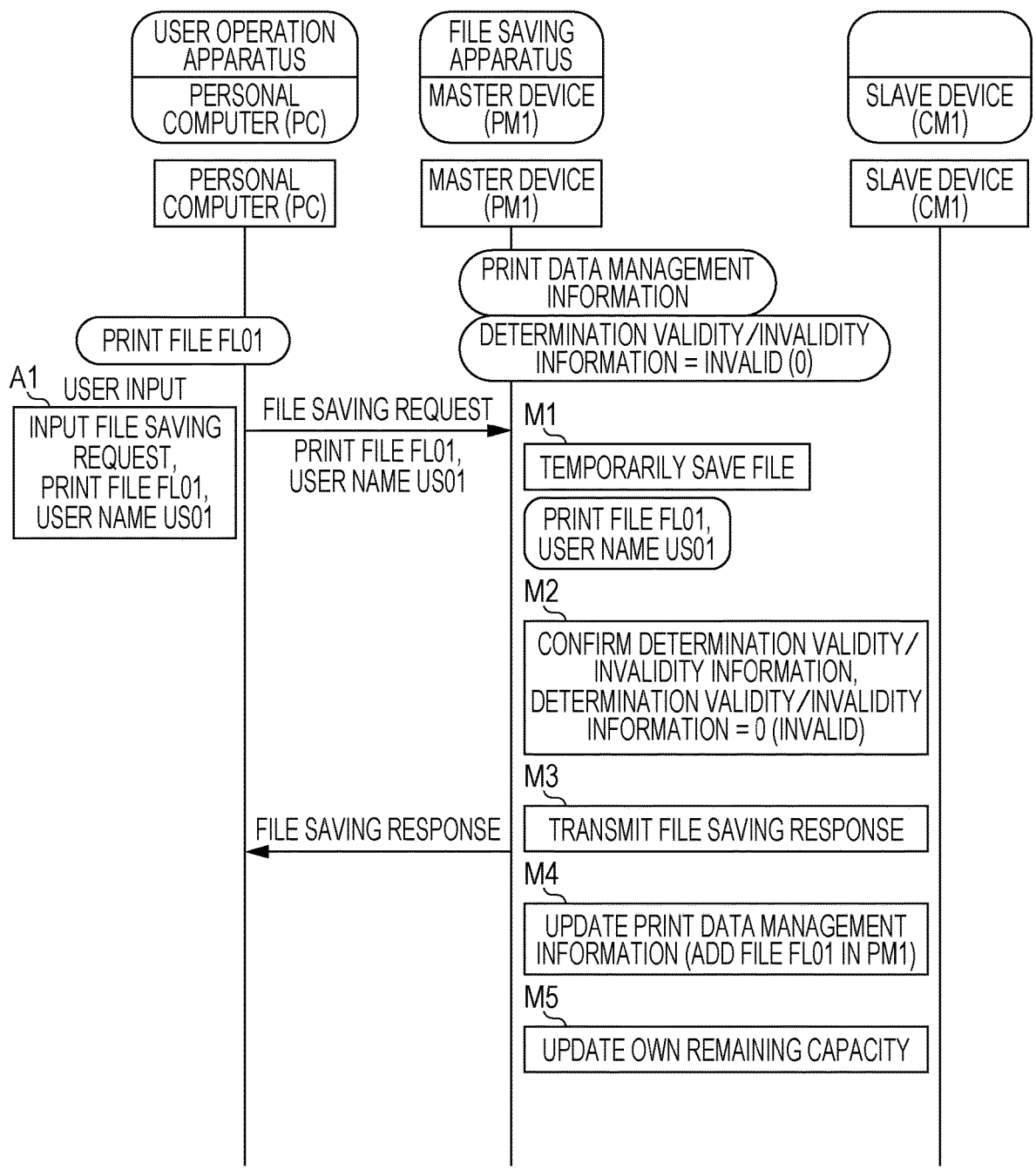
FIG. 5 illustrates a sequence of an exemplary embodiment of processing of saving a print file in the master device.

FIG. 5 illustrates a sequence of an exemplary embodiment of processing of saving a print file in the master device.

As described above, a print file that is input by a user for printing or a print file transmitted from an information processing apparatus for printing is temporarily saved as a saved file in either the master device PM1 or the slave device CM.

However, a file that is obtained by input or the like is saved in the master device PM1 once.

Here, a sequence in which the user transmits, to the master device PM1, a print file created by a personal computer PC or a print file stored in the personal computer PC and temporarily saves such a print file in the master device PM1 will be described. It is assumed that, in the present exemplary embodiment, the determination validity/invalidity information H0 of the use frequency determination information 55c stored in the master device PM1 is set in advance to invalid (0). Thus, the use frequency is not used to determine whether to move a saved file to another image forming apparatus.

In FIG. 5, it is assumed that an operation apparatus by which the user inputs a print file to be printed is a personal computer PC and a saving apparatus in which a saved file is saved is the master device PM1. It is also assumed that a print file FL01 to be printed by the user is stored in the personal computer PC and the print data management information 55a is stored in advance in the master device PM1.

First, at step A1, in order to save, in the master device PM1, the print file FL01 to be printed, a user with a user name US01 inputs a file saving request of the print file FL01 by using a keyboard or a touch panel in the personal computer PC. Through the input, the file saving request including the user name US01 and the print file FL01 is transmitted to the master device PM1.

At step M1, when the master device PM1 receives the file saving request, the print file FL01 is temporarily saved in the temporary storage unit 53 of the storage unit of the master device PM1. Here, the print file FL01 is saved in association with the user name US01.

At step M2, the use frequency confirmation unit 39 of the master device PM1 confirms the determination validity/invalidity information H0 of the use frequency determination information 55c. Here, when the determination validity/invalidity information H0 is set to invalid (0), confirmation of the use count or the like is not performed and the procedure proceeds to step M3. When the determination validity/invalidity information H0 is set to invalid (0), the print file FL01 that is temporarily saved is directly saved as a saved file in the temporary storage unit 53 of the master device PM1.

At step M3, the communication unit 26 transmits a file saving response to the personal computer PC transmitting the file saving request. It is desired that the file saving response includes the user name US01 and information indicating that the print file FL01 is saved. Though there is nothing in particular that the personal computer PC receiving the file saving response has to do, the personal computer PC may, for example, display the information, which indicates that the print file FL01 is saved in the master device PM1, to inform the user.

At step M4, since the new print file FL01 is saved in the master device PM1, the print data management information update unit 38 updates the print data management information 55a. Here, as illustrated in FIG. 4A, the saved file name FL01, the user name US01, and PM1 of the saving apparatus information HM are added to the print data management information 55a in association with each other.

At step M5, since the saved file FL01 is newly saved, the own remaining capacity of the master device PM1 is updated. The own remaining capacity of the master device PM1 is reduced. Here, the current own remaining capacity is confirmed by the own remaining capacity confirmation unit 41a and stored in the own remaining capacity information 52.

By the foregoing sequence, the determination validity/invalidity information H0 of the use frequency determination information 55c is set to invalid (0), so that the print file FL01 that is requested to be saved is saved in the master device PM1 and the own remaining capacity information 52 of the master device PM1 is changed.

Exemplary Embodiment 2 of Saving

Figure 6:
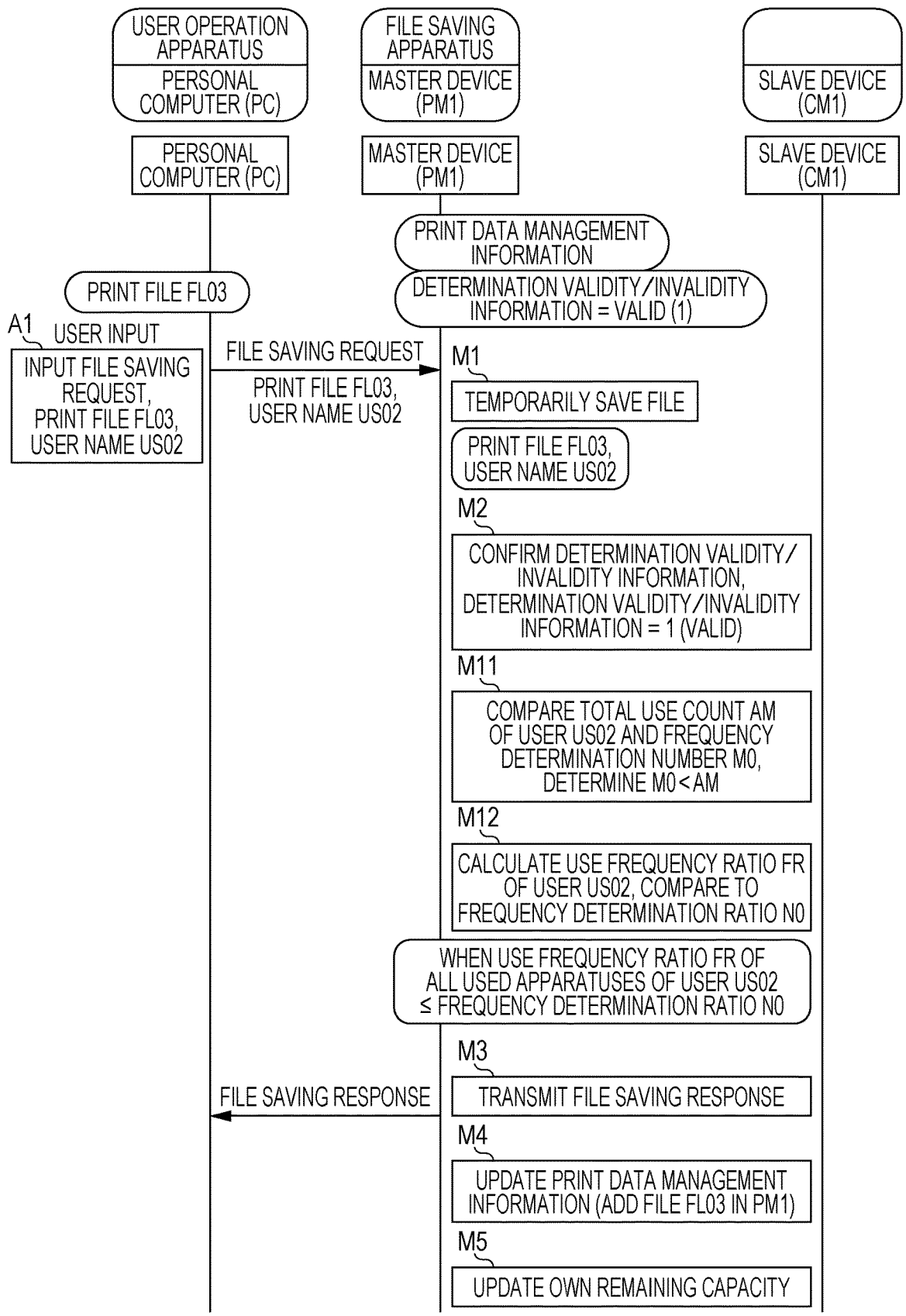
FIG. 6 illustrates a sequence of an exemplary embodiment of processing of saving a print file in the master device.

FIG. 6 illustrates a sequence of an exemplary embodiment of processing of saving a print file in the master device.

In the exemplary embodiment, differently from FIG. 5, it is assumed that the determination validity/invalidity information H0 of the use frequency determination information 55c stored in the master device PM1 is set in advance to valid (1). Thus, the use frequency is used to determine whether to move a saved file to another image forming apparatus. Moreover, as indicated below, it is assumed that the use frequency ratios FR of all image forming apparatuses that have been used by the user are equal to or less than the frequency determination ratio N0 (FR≤N0).

In FIG. 6, it is assumed that an operation apparatus by which the user inputs a print file to be printed is a personal computer and a saving apparatus in which a saved file is saved is the master device PM1. Here, a sequence in which the user with the user name US02 transmits a print file FL03, for example, created by a personal computer to the master device PM1 and temporarily saves the print file FL03 in the master device PM1 will be described. It is assumed that the print file FL03 to be printed by the user is stored in the personal computer PC and the print data management information 55a is stored in advance in the master device PM1. In the sequence of FIG. 6, a step at which similar processing to that of the step of FIG. 5 is performed will be given the same number.

First, at step A1, in order to save, in the master device PM1, the print file FL03 to be printed, the user with the user name US02 inputs a file saving request of the print file FL03 by using a keyboard or a touch panel in the personal computer PC. Through the input, the file saving request including the user name US02 and the print file FL03 is transmitted to the master device PM1.

At step M1, when the master device PM1 receives the file saving request, the print file FL03 is temporarily saved in the temporary storage unit 53 of the storage unit of the master device PM1. Here, the print file FL03 is saved in association with the user name US02.

At step M2, the use frequency confirmation unit 39 of the master device PM1 confirms the determination validity/invalidity information H0 of the use frequency determination information 55c. Here, since the determination validity/invalidity information H0 is set to valid (1), the procedure proceeds to step M11 to confirm the use count or the like.

At step M11, the use frequency confirmation unit 39 compares the total use count AM of the user name US02 to the frequency determination number M0. When the total use count AM of the user name US02 is 10 as illustrated in FIG. 4B and the frequency determination number M0 is 9 as illustrated in FIG. 4C, frequency determination number M0<total use count AM is provided, so that it is determined that the total use count of the user name US02 is greater than the number of times of determination to consider the use frequency, and determination of the use frequency is performed.

At step M12, the use frequency ratio FR of the user name US02 is calculated and compared to the frequency determination ratio N0. Here, the use frequency ratios FR of all image forming apparatuses that have been used by the user with the user name US02 are calculated. As illustrated in FIG. 4B, it is assumed that the image forming apparatuses (used apparatus information HM) that have been used by the user with the user name US02 are the master device PM1, the slave device CM1, and the slave device CM2, and use counts CT of the user for the master device PM1, the slave device CM1, and the slave device CM2 are respectively 3 times, 3 times, and 4 times. It is also assumed that the frequency determination ratio N0 is 50% as illustrated in FIG. 4C.

At this time, the use frequency ratio FR (%) of each of the used apparatuses is obtained by multiplying use count CT/total use count AM by 100, and the use frequency ratio FR of the master device PM1 is 30%, the use frequency ratio FR of the slave device CM1 is 30%, and the use frequency ratio FR of the slave device CM2 is 40%. The three use frequency ratios FR are smaller than the frequency determination ratio N0 (50%). That is, the use frequency ratios FR of all the image forming apparatuses that have been used by the user are equal to or less than the frequency determination ratio N0 (FR≤N0). In this case, it is determined that all the use frequencies for the image forming apparatuses that have been used by the user with the user name US02 are not so high, and the print file FL03 that is requested to be saved is not moved to another image forming apparatus and is directly saved in the master device PM1.

Subsequently, processing similar to that of steps from M3 to M5 illustrated in FIG. 5 is performed.

At step M3, the communication unit 26 transmits a file saving response to the personal computer PC transmitting the file saving request. It is desired that the file saving response includes the user name US02 and information indicating that the print file FL03 is saved. Though there is nothing in particular that the personal computer PC receiving the file saving response has to do, the personal computer PC may, for example, display the information, which indicates that the print file FL03 is saved in the master device PM1, to inform the user.

At step M4, since the new print file FL03 is saved in the master device PM1, the print data management information update unit 38 updates the print data management information 55a. Here, as illustrated in FIG. 4A, the saved file name FL03, the user name US02, and PM1 of the saving apparatus information HM are added to the print data management information 55a in association with each other.

At step M5, since the saved file FL03 is newly saved, the own remaining capacity of the master device PM1 is updated. The own remaining capacity of the master device PM1 is reduced. Here, the current own remaining capacity is confirmed by the own remaining capacity confirmation unit 41a and stored in the own remaining capacity information 52.

By the foregoing sequence, the determination validity/invalidity information H0 of the use frequency determination information 55c is set to valid (1), so that whether to move the saved file to another image forming apparatus is determined by considering the use frequency. Moreover, since the use frequency ratios FR of all the image forming apparatuses that have been used by the user are equal to or less than the frequency determination ratio N0, the print file FL03 that is requested to be saved is saved in the master device PM1 and the own remaining capacity information 52 of the master device PM1 is changed.

Exemplary Embodiment 3 of Saving

Figure 7:
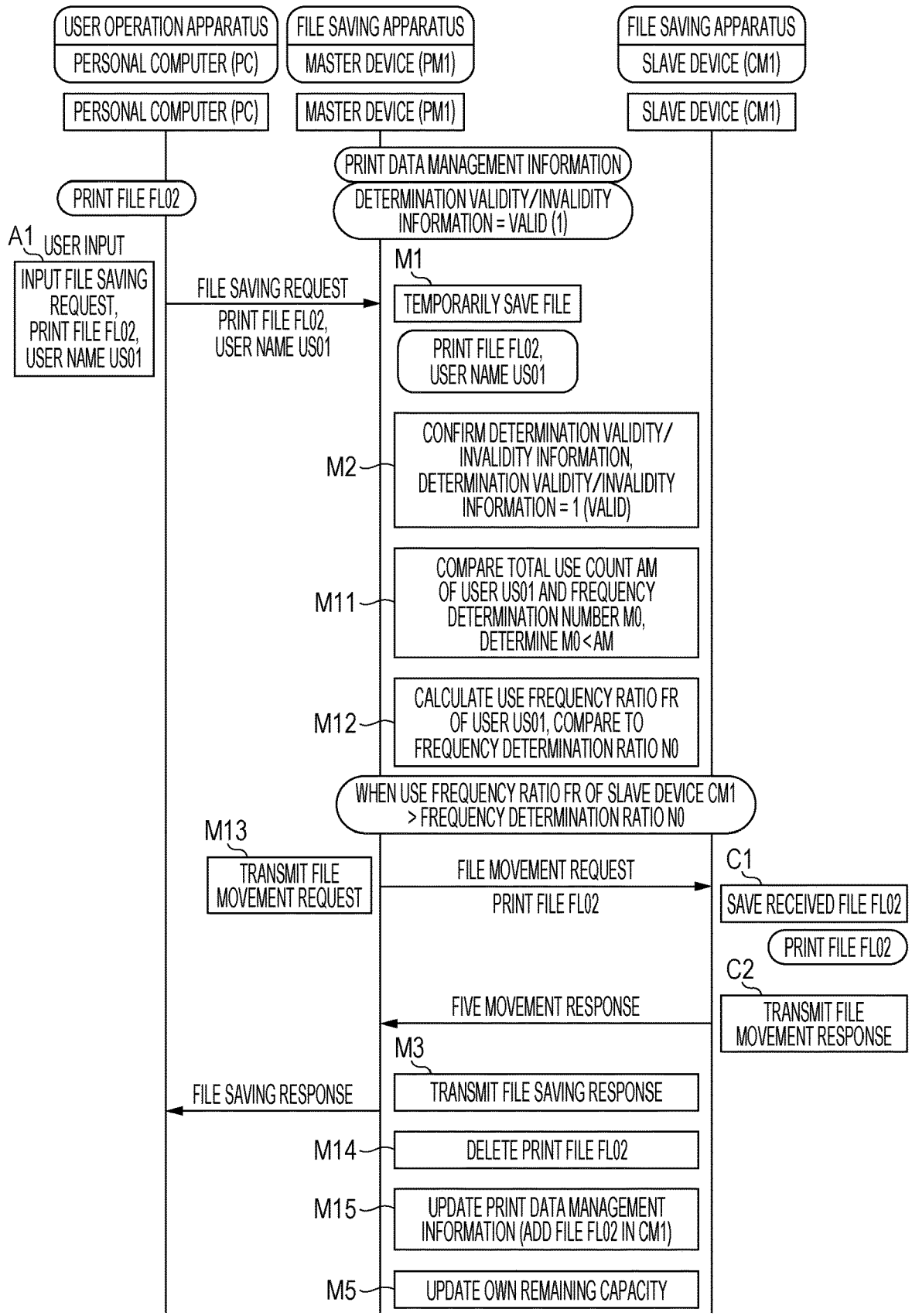
FIG. 7 illustrates a sequence of an exemplary embodiment of processing of saving a print file in a slave device.

FIG. 7 illustrates a sequence of an exemplary embodiment of processing of saving a print file in a slave device.

In the present exemplary embodiment, similarly to FIG. 6, it is assumed that the determination validity/invalidity information H0 of the use frequency determination information 55c stored in the master device PM1 is set in advance to valid (1). Thus, the use frequency is used to determine whether to move a saved file to another image forming apparatus. Moreover, as indicated below, differently from FIG. 6, it is assumed that the use frequency ratio FR of the slave device CM1 that has been used by the user is greater than the frequency determination ratio N0 (FR>N0).

In FIG. 7, it is assumed that an operation apparatus by which the user inputs a print file to be printed is a personal computer PC and saving apparatuses in which a saved file is saved are the master device PM1 and the slave device CM1. Here, a sequence in which the user with the user name US01 transmits the print file FL02, for example, created by the personal computer to the master device PM1 and temporarily saves the print file FL02 in the slave device CM1 will be described. It is assumed that the print file FL02 to be printed by the user is stored in the personal computer PC and the print data management information 55a is stored in advance in the master device PM1. In the sequence of FIG. 7, a step at which similar processing to that of the step of FIG. 5 is performed will be given the same number.

First, at step A1, in order to save, in the master device PM1, the print file FL02 to be printed, the user with the user name US01 inputs a file saving request of the print file FL02 by using a keyboard or a touch panel in the personal computer PC. Through the input, the file saving request including the user name US01 and the print file FL02 is transmitted to the master device PM1.

At step M1, when the master device PM1 receives the file saving request, the print file FL02 is temporarily saved in the temporary storage unit 53 of the storage unit of the master device PM1. Here, the print file FL02 is saved in association with the user name US01.

At step M2, the use frequency confirmation unit 39 of the master device PM1 confirms the determination validity/invalidity information H0 of the use frequency determination information 55c. Here, since the determination validity/invalidity information H0 is set to valid (1), the procedure proceeds to step M11 to confirm the use count or the like.

At step M11, the use frequency confirmation unit 39 compares the total use count AM of the user name US01 to the frequency determination number M0. When the total use count AM of the user name US01 is 20 as illustrated in FIG. 4B and the frequency determination number M0 is 9 as illustrated in FIG. 4C, frequency determination number M0<total use count AM is provided, so that it is determined that the total use count of the user name US01 is greater than the number of times of determination to consider the use frequency and determination of the use frequency is performed.

At step M12, the use frequency ratio FR of the user name US01 is calculated and compared to the frequency determination ratio N0. Here, the use frequency ratios FR of all image forming apparatuses that have been used by the user with the user name US01 are calculated. As illustrated in FIG. 4B, it is assumed that the image forming apparatuses (used apparatus information HM) that have been used by the user with the user name US01 are the master device PM1, the slave device CM1, and the slave device CM2, and use counts CT of the user for the master device PM1, the slave device CM1, and the slave device CM2 are respectively 4 times, 14 times, and twice. It is also assumed that the frequency determination ratio N0 is 50% as illustrated in FIG. 4C.

At this time, the use frequency ratio FR (%) of each of the used apparatuses is obtained by multiplying use count CT/total use count AM by 100, and the use frequency ratio FR of the master device PM1 is 20%, the use frequency ratio FR of the slave device CM1 is 70%, and the use frequency ratio FR of the slave device CM2 is 10%. Among the three use frequency ratios FR, only the use frequency ratio FR of the slave device CM1 is greater than the frequency determination ratio N0 (50%) (FR of the slave device CM1>N0). In this case, it is determined that, among the image forming apparatuses that have been used by the user with the user name US01, the use frequency of the user with the user name US01 for the slave device CM1 is very high and the print file FL02 that is requested to be saved is moved to the slave device CM1.

At step M13, the file movement request unit 37 transmits a file movement request to the slave device CM1. The print file FL02 is attached to the file movement request.

At step C1, upon reception of the file movement request, the slave device CM1 saves the received print file FL02 in the temporary storage unit 93.

At step C2, a file movement response indicating that the print file FL02 is saved in the slave device CM1 is transmitted from the slave device CM1 to the master device PM1.

At step M3, similarly to FIG. 5, the communication unit 26 transmits a file saving response to the personal computer PC transmitting the file saving request. It is desired that the file saving response includes the user name US01, the slave device CM1, and information indicating that the print file FL02 is saved. Though there is nothing in particular that the personal computer PC receiving the file saving response has to do, the personal computer PC may, for example, display the information, which indicates that the print file FL02 is saved in the slave device CM1, to inform the user.

At step M14, the file deletion unit 34 deletes the print file FL02 saved in the temporary storage unit 53 of the master device PM1. In this manner, since the print file FL02 is moved to the slave device CM1 that is frequently used by the user US01, by deleting the print file FL02 saved in the master device PM1, it is possible to prevent reduction of the remaining capacity of the master device PM1. In a case where setting not to delete the file saved in the temporary storage unit 53 of the master device PM1 is performed, however, the print file FL02 is not deleted.

At step M15, since the new print file FL02 is saved in the slave device CM1, the print data management information update unit 38 updates the print data management information 55a. Here, as illustrated in FIG. 4A, the saved file name FL02, the user name US01, and CM1 of the saving apparatus information HM are added to the print data management information 55a in association with each other.

At step M5, the own remaining capacity of the master device PM1 is updated. Since the saved file FL02 is deleted, the own remaining capacity of the master device PM1 does not change. In a case where the saved file FL02 is not deleted from the master device PM1, however, the own remaining capacity of the master device PM1 is reduced. Here, the current own remaining capacity is confirmed by the own remaining capacity confirmation unit 41a and stored in the own remaining capacity information 52.

By the foregoing sequence, the determination validity/invalidity information H0 of the use frequency determination information 55c is set to valid (1), so that whether to move the saved file to another image forming apparatus is determined by considering the use frequency. Moreover, since the use frequency ratio FR of a specific slave device CM1 that has been used by the user is greater than the frequency determination ratio N0, the print file FL02 that is requested to be saved is moved to the slave device CM1.

Exemplary Embodiment 4 of Saving

Figure 8:
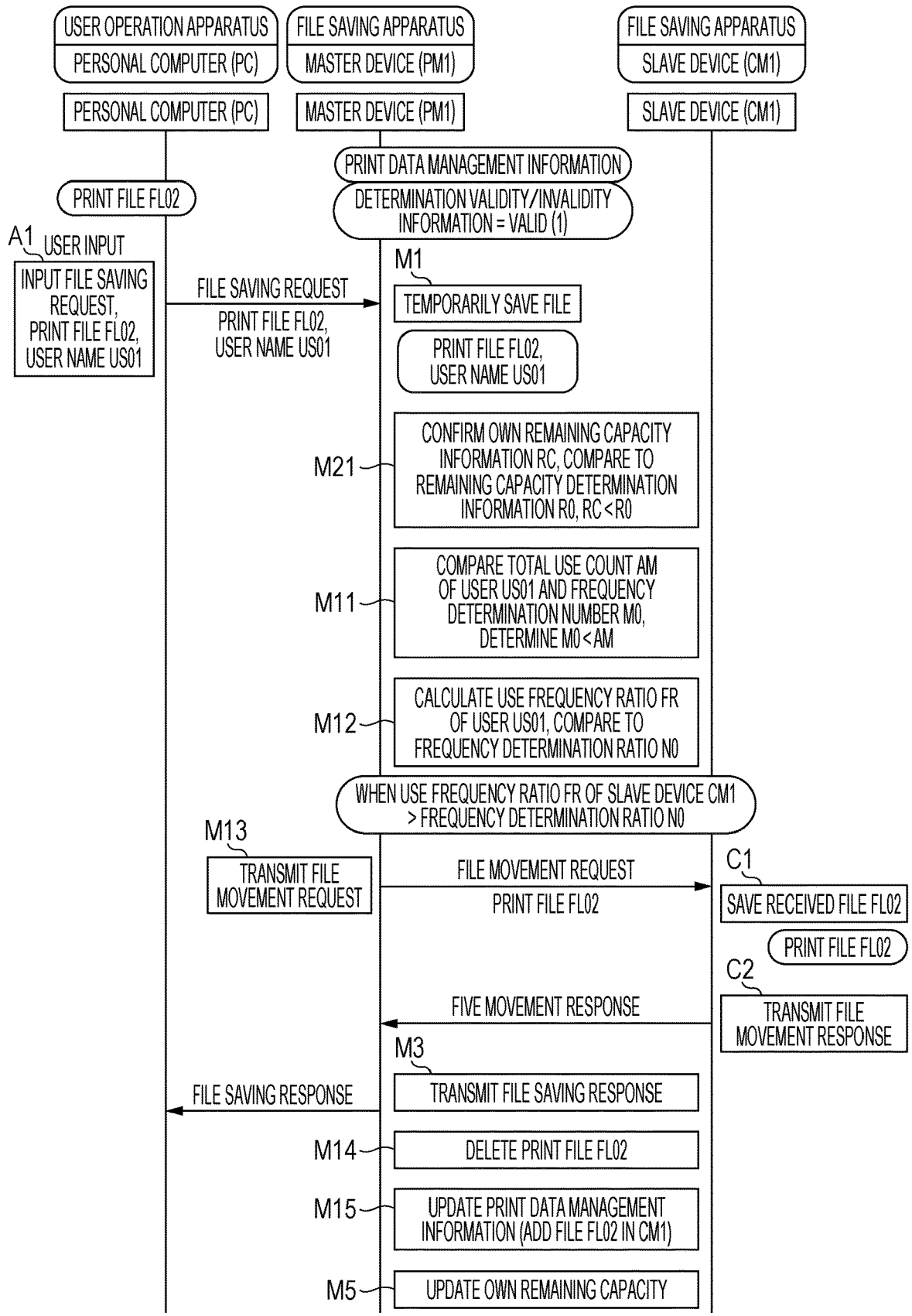
FIG. 8 illustrates a sequence of an exemplary embodiment of processing of saving a print file in a slave device by considering a remaining capacity of the master device.

FIG. 8 illustrates a sequence of an exemplary embodiment of processing of saving a print file in a slave device by considering the own remaining capacity of the master device PM1.

In the present exemplary embodiment, similarly to FIG. 6 or 7, it is assumed that the determination validity/invalidity information H0 of the use frequency determination information 55c stored in the master device PM1 is set in advance to valid (1). Similarly to FIG. 7, it is also assumed that the use frequency ratio FR of the slave device CM1 that has been used by the user is greater than the frequency determination ratio N0 (FR>N0). In the present exemplary embodiment, however, differently from FIG. 7, it is assumed that the own remaining capacity of the master device PM1 is confirmed, and when the own remaining capacity is smaller than predetermined remaining capacity determination information, movement determination is performed by considering the use frequency.

In FIG. 8, it is assumed that an operation apparatus by which the user inputs a print file to be printed is a personal computer PC and saving apparatuses in which a saved file is saved are the master device PM1 and the slave device CM1. Here, a sequence in which the user with the user name US01 transmits the print file FL02, for example, created by a personal computer to the master device PM1 and temporarily saves the print file FL02 in the slave device CM1 will be described. It is assumed that the print file FL02 to be printed by the user is stored in the personal computer PC and the print data management information 55a is stored in advance in the master device PM1. In the sequence of FIG. 8, a step at which similar processing to that of the step of FIG. 7 is performed will be given the same number.

First, at step A1, in order to save, in the master device PM1, the print file FL02 to be printed, the user with the user name US01 inputs a file saving request of the print file FL02 by using a keyboard or a touch panel in the personal computer PC. Through the input, the file saving request including the user name US01 and the print file FL02 is transmitted to the master device PM1.

At step M1, when the master device PM1 receives the file saving request, the print file FL02 is temporarily saved in the temporary storage unit 53 of the storage unit of the master device PM1. Here, the print file FL02 is saved in association with the user name US01.

At step M21, the own remaining capacity confirmation unit 41a confirms the own remaining capacity information RC of the master device PM1 and compares the own remaining capacity information RC to the remaining capacity determination information R0. Here, when the own remaining capacity information RC of the master device PM1 is 8 GB and the remaining capacity determination information R0 is 10 GB as illustrated in FIG. 4D, own remaining capacity information RC<remaining capacity determination information R0 is provided, so that it is determined that the storage capacity of the master device PM1 is considerably reduced. In a case where the storage capacity of the master device PM1 is considerably reduced, there is a possibility that a print file is not able to be saved in the master device PM1 in the future, so that whether to move the print file is determined by considering the use frequency and the print file is moved to an image forming apparatus other than the master device PM1.

In a case of own remaining capacity information RC>remaining capacity determination information R0, however, it is determined that the master device PM1 still has a margin for the storage capacity, and the print file may be saved in the master device PM1 without determining whether to move the print file by considering the use frequency.

Subsequently, similarly to FIG. 7, processing from steps from M11 to M5 and processing of steps C1 and C2 are performed. That is, whether to move the print file is determined by considering the use frequency, and in a case where the use frequency ratio FR of the specific slave device CM1 that has been used by the user is greater than the frequency determination ratio N0, the print file FL02 that is requested to be saved is moved to the slave device CM1 and the print file FL02 that is temporarily saved in the master device PM1 is deleted.

However, in a case where whether to move the print file is determined by considering the use frequency, when the use frequency ratios FR of all the image forming apparatuses that have been used by the user are equal to or less than the frequency determination ratio N0, in order to secure a sufficient storage capacity of the master device PM1, it is desired that the print file FL02 is moved, for example, to an image forming apparatus having the greatest use frequency ratio FR among the use frequency ratios FR of all the image forming apparatuses that have been used by the user.

By the foregoing sequence, own remaining capacity information RC<remaining capacity determination information R0 is provided, and in a case where it is determined that the storage capacity of the master device PM1 is considerably reduced, whether to move the saved file to another image forming apparatus is determined by considering the use frequency, and in a case where the use frequency ratio FR of the specific slave device CM1 that has been used by the user is greater than the frequency determination ratio N0, the print file FL02 that is requested to be saved is moved to the slave device CM1. This prevents the storage capacity of the master device PM1 from being reduced to a given value or less and it is possible to secure a sufficient storage capacity to execute a function of the master device PM1.

Another Exemplary Embodiment of Saving

The exemplary embodiment 4 of saving described above indicates an exemplary embodiment in which whether to move the print file is determined by using the remaining capacity of the storage unit of the master device PM1 and use frequency information of the user. However, a condition to move the print file is not limited to those of the exemplary embodiments 1 to 4 of saving described above. For example, in a case where any of movement conditions below is satisfied, the print file temporarily saved in the master device PM1 may be moved to another image forming apparatus.

(A1) The use frequency confirmation unit 39 may compare, for the user who inputs the print file, use counts CT of the user for slave devices CM (image forming apparatuses), which are included in the user use frequency information 55b, and select a slave device CM whose use count CT is the greatest, and the file movement request unit 37 may move the print file, which is input by the user, to the selected slave device CM.

(A2) The transfer determination number T0 used to determine whether or not to move the print file, which is temporarily saved, to another image forming apparatus may be stored in advance in the storage unit 50, the use frequency confirmation unit 39 may select, for the user who inputs the print file, any one slave device CM (image forming apparatus) whose use count CT of the user for each of the slave devices CM, which is included in the user use frequency information 55b, is greater than the transfer determination number T0, and the file movement request unit 37 may move the print file, which is input by the user, to the selected slave device CM.

(A3) In a case where there are a plurality of slave devices CM (image forming apparatuses) whose use counts CT of the user for the slave device CM, which are included in the user use frequency information 55b, are greater than the transfer determination number T0, a slave device CM whose use count CT of the user for each of the slave devices CM is the largest may be selected, and the print file input by the user may be moved to the selected slave device CM.

(A4) In a case whether a slave device CM satisfies the condition of the use frequency of the user as in the exemplary embodiments described above and the remaining capacity of the storage unit of the slave device CM is greater than the remaining capacity of the storage unit of the master device PM1, the print file temporarily saved in the storage unit of the master device PM1 may be moved to the slave device CM.

(A5) In a case where the master device PM1 is executing another function such as a copy function and is continuously in a state of having only a margin of processing capability of a given value or less, the print file temporarily saved in the storage unit 50 of the master device PM1 is moved to a slave device CM that is most frequently used by the user or a slave device CM that has the largest remaining capacity. In such a case, the remaining capacity of the slave device CM to which the print file is moved may not be larger than the remaining capacity of the storage unit of the master device PM1.

(A6) Also in a case where the master device PM1 is in operation, but may not be normally operated because of special processing such as maintenance being performed, the print file temporarily saved in the storage unit 50 of the master device PM1 is moved to a slave device CM that is most frequently used by the user or a slave device CM that has the largest remaining capacity.

Moreover, in a case where there are a plurality of print files temporarily saved in the storage unit 50 of the master device PM1, it is desired that not all the plurality of print files are moved to the same one slave device CM frequently used by the user but the plurality of print files are moved to be distributed to some slave devices CM, for example, on the basis of any of criteria below.

(B1) File sizes of the plurality of print files temporarily saved in the storage unit 50 of the master device PM1 are confirmed, and a print file having a larger file size is preferentially moved to a slave device CM that is most frequently used by the user.

(B2) File sizes of the plurality of print files temporarily saved in the storage unit 50 of the master device PM1 are confirmed, and all print files whose file sizes are larger than a given size are moved one by one to different slave devices CM in descending order of the use frequency of the user.

(B3) The plurality of print files temporarily saved in the storage unit 50 of the master device PM1 are sorted in descending order of the file size, and when the print files are moved, the plurality of print files are selected in descending order of the file size so that the remaining capacity of the storage unit of the master device PM1 is equal to or less than a given value, and the plurality of print files that are selected are separately moved in a distributed manner to one or more slave devices CM having a larger remaining capacity than the remaining capacity of the master device PM1. Also in this case, the print files are moved in a distributed manner by preferentially selecting some slave devices CM frequently used by the user.

<Explanation of Sequence of Print Processing of Print File>

Here, description will be given for each exemplary embodiment of a detailed sequence in which a saved file temporarily saved in the master device PM1 is printed in a slave device CM, a detailed sequence in which a saved file temporarily saved in a slave device CM is printed in another slave device CM, a detailed sequence in which a saved file temporarily saved in the master device PM1 is printed in the master device PM1, a detailed sequence in which a saved file temporarily saved in a slave device CM is printed in the master device PM1, and a detailed sequence in which a saved file temporarily saved in a slave device CM is printed in the same slave device CM.

The user goes to the master device PM1 or any slave device CM, and performs an operation of printing a saved file that has been already input by the user.

Though an image forming apparatus in which the user performs the print operation may be either the master device PM1 or the slave device CM, it is assumed that the slave device CM is connected to a network that allows communication with the master device PM1.

Exemplary Embodiment 1 of Printing

Figure 9:
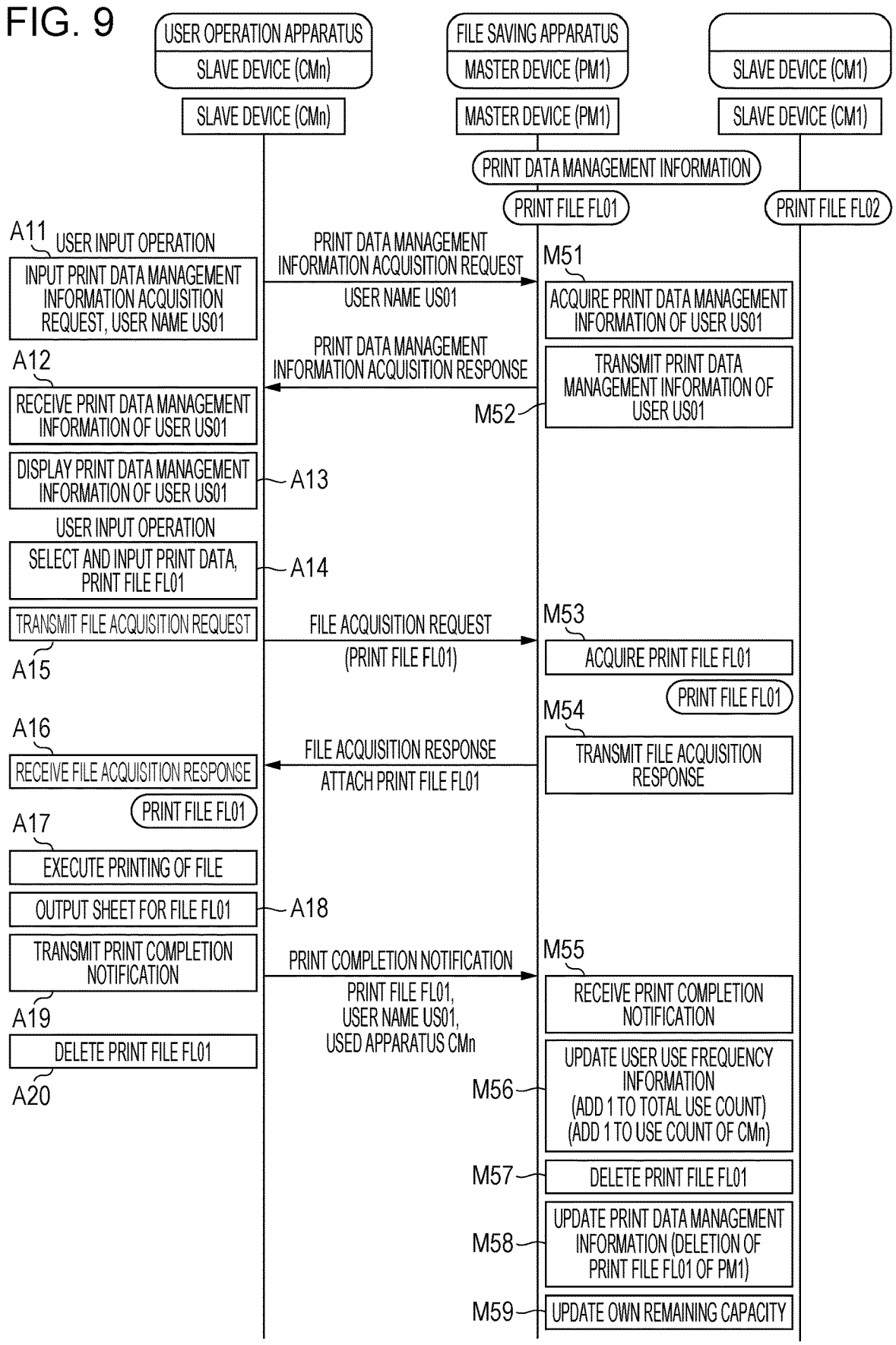
FIG. 9 illustrates a sequence of an exemplary embodiment of processing in which a print file saved in the master device is printed in a slave device.

FIG. 9 illustrates the detailed sequence of an exemplary embodiment of processing in which a print file saved in the master device is printed in a slave device.

In FIG. 9, it is assumed that an operation apparatus by which the user with the user name US01 selects a print file to be printed to perform a print operation is a slave device CMn and a saving apparatus in which a saved file to be printed is saved is the master device PM1.

It is also assumed that the print data management information 55a is stored in advance in the mater device PM1 and the print file FL01 itself to be printed by the user US01 is saved in the master device PM1.

Further, it is assumed that names of the print files FL01 and FL02 are stored in the print data management information 55a in association with the user name US01 as illustrated in FIG. 4A. That is, it is assumed that two print files (FL01 and FL02) for the user with the user name US01 are respectively stored in the master device PM1 and the slave device CM1.

First, at step A11, it is assumed that the user with the user name US01 performs an input operation of requesting print data management information of the user name US01 by using the operation unit 72 of the slave device CMn. Thereby, the print data management information acquisition unit 81 of the slave device CMn transmits a print data management information acquisition request to the master device PM1. The print data management information acquisition request includes the user name US01.

At step M51, the master device PM1 receives the print data management information acquisition request.

Thereby, the print data management information acquisition unit 31 of the master device PM1 acquires (reads out) the print data management information 55a from the storage unit 50. Here, only print data management information in which US01 is stored as the user name UN is searched for and read out in the print data management information 55a of FIG. 4A.

At step M52, the acquired print data management information about the user name US01 is included in a print data management information acquisition response and the print data management information acquisition response is transmitted to the slave device CMn transmitting the print data management information acquisition request.

At step A12, the slave device CMn receives the print data management information acquisition response including the print data management information of the user name US01 and reads out the print data management information of the user name US01.

At step A13, the received print data management information of the user name US01 is displayed on the display unit 74.

At step A14, the user US01 confirms the displayed print data management information, selects the print file FL01 to be printed from the print data management information of the user name US01, and performs an operation meaning a print request.

At step A15, the file acquisition request unit 82 of the slave device CMn transmits a file acquisition request including the name of the print file FL01, to the master device PM1 in which the print file FL01 is saved.

At step M53, when the master device PM1 receives the file acquisition request, the print file acquisition unit 35 acquires (reads out) the print file FL01, which is temporarily saved in the master device PM1, from the storage unit 50 of the master device PM1.

At step M54, the acquired print file FL01 is attached to a file acquisition response and the file acquisition response is transmitted to the slave device CMn transmitting the file acquisition request.

At step A16, the slave device CMn receives the file acquisition response including the print file FL01.

Thereby, the received print file FL01 is temporarily stored in the storage unit 90.

At step A17, the print execution unit 83 of the slave device CMn executes print processing of the print file FL01.

At step A18, the output unit 75 of the slave device CMn outputs a sheet on which information of the print file FL01 is printed.

At step A19, the slave device CMn transmits, to the master device PM1, print completion notification indicating that printing of the print file FL01 is completed. The print completion notification includes the print file name FL01, the user name US01, and the name CMn of the slave device that is a used apparatus executing printing.

At step A20, the file deletion unit 84 of the slave device CMn deletes the print file FL01 temporarily stored in the slave device CMn. In a case where setting not to delete the print file is performed, however, the print file FL01 is not deleted.

At step M55, the master device PM1 receives the print completion notification.

At step M56, the use frequency update unit 40 updates the user use frequency information 55b. Here, 1 is added to the total use count AM corresponding to the user name US01 and 1 is added to the use count CT of the slave device CMn of the used apparatus information HM corresponding to the user name US01.

At step M57, the file deletion unit 34 of the master device PM1 deletes the print file FL01 temporarily stored in the master device PM1. Thereby, the print file FL01 is deleted, so that the remaining capacity of the master device PM1 is increased.

At step M58, since the print file FL01 is deleted from the master device PM1, the print data management information update unit 38 updates the print data management information 55a. Here, information in which the saved file name FL01, the user name US01, and PM1 of the saving apparatus information HM are associated with each other is deleted from the print data management information 55a of FIG. 4A.

At step M59, since the saved file FL01 is deleted, the own remaining capacity of the master device PM1 is updated. The own remaining capacity of the master device PM1 is increased. Here, the current own remaining capacity is confirmed by the own remaining capacity confirmation unit 41a and stored in the own remaining capacity information 52.

By the foregoing sequence, the user selects the print file FL01 to be printed and performs an operation meaning a print request in the slave device CMn, so that even when the user does not know an apparatus (master device PM1) in which the print file FL01 is saved, a sheet on which information of the print file FL01 is printed is output from the slave device CMn in which the user performs the operation.

Exemplary Embodiment 2 of Printing

Figure 10:
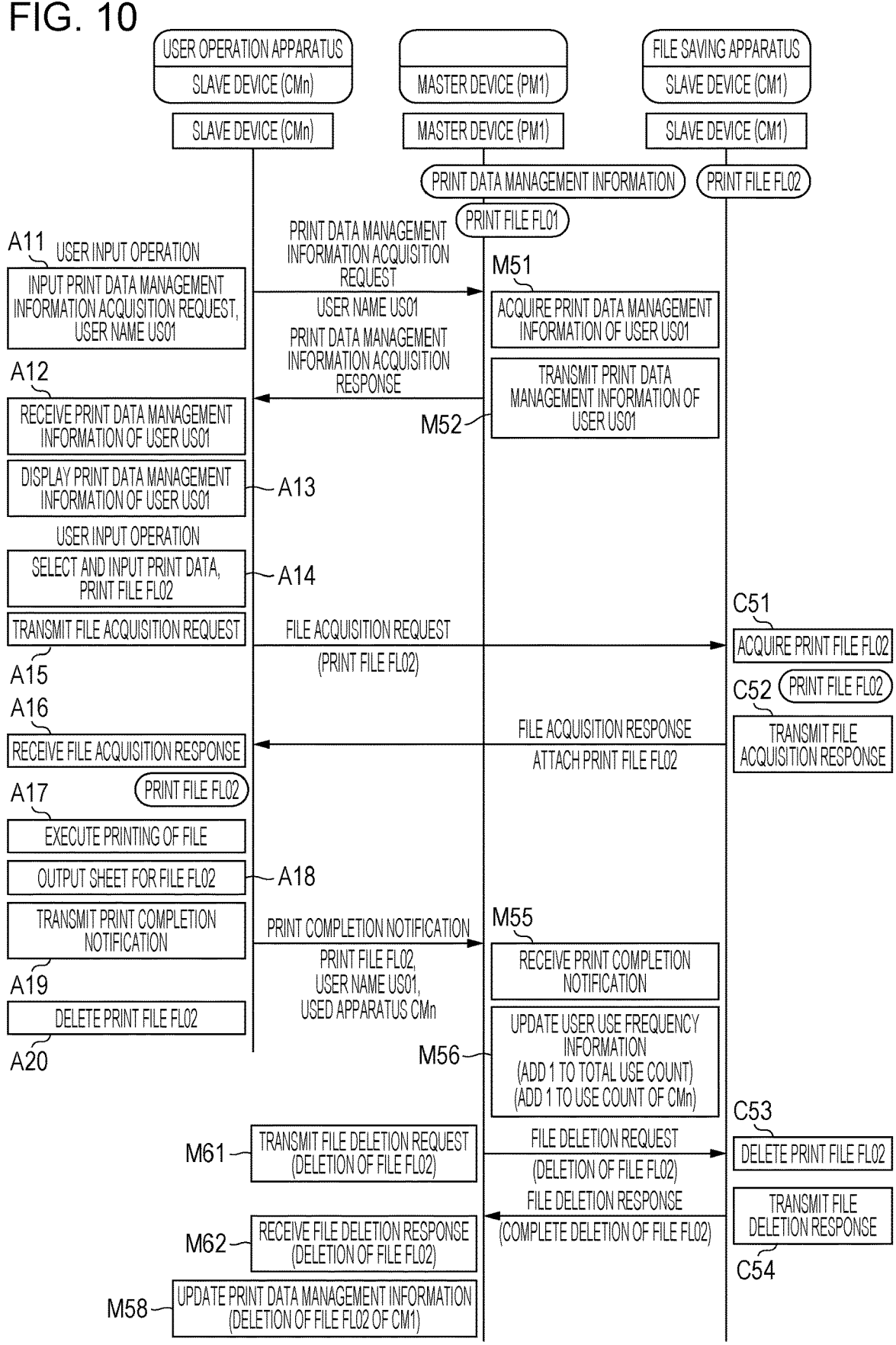
FIG. 10 illustrates a sequence of an exemplary embodiment of processing in which a print file saved in a slave device is printed in another slave device.

FIG. 10 illustrates the detailed sequence of an exemplary embodiment of processing in which a print file saved in a slave device is printed in another slave device.

In FIG. 10, it is assumed that an operation apparatus by which the user with the user name US01 selects a print file to be printed to perform a print operation is a slave device CMn and a saving apparatus in which a saved file to be printed is saved is the slave device CM1.

It is also assumed that the print data management information 55a is stored in advance in the mater device PM1 and the print file FL02 itself to be printed by the user US01 is saved in the slave device CM1.

Further, it is assumed that names of the print files FL01 and FL02 are stored in the print data management information 55a in association with the user name US01 as illustrated in FIG. 4A. That is, it is assumed that two print files (FL01 and FL02) for the user with the user name US01 are respectively stored in the master device PM1 and the slave device CM1. In the sequence of FIG. 10, a step at which the same processing as that of the step of FIG. 9 is performed will be given the same number.

First, at steps from A11 to A13, processing similar to that of FIG. 9 is performed.

That is, at step A11, when the user with the user name US01 performs an input operation of requesting print data management information of the user name US01 by using the operation unit 72 of the slave device CMn, the print data management information acquisition unit 81 of the slave device CMn transmits a print data management information acquisition request including the user name US01 to the master device PM1.

At step M51, when the master device PM1 receives the print data management information acquisition request, the print data management information acquisition unit 31 of the master device PM1 acquires (reads out) the print data management information 55a from the storage unit 50. Here, only print data management information in which US01 is stored as the user name UN is searched for and read out in the print data management information 55a of FIG. 4A.

At step M52, the acquired print data management information about the user name US01 is included in a print data management information acquisition response and the print data management information acquisition response is transmitted to the slave device CMn transmitting the print data management information acquisition request.

At step A12, the slave device CMn receives the print data management information acquisition response including the print data management information of the user name US01 and reads out the print data management information of the user name US01.

At step A13, the received print data management information of the user name US01 is displayed on the display unit 74.

At step A14, the user US01 confirms the displayed print data management information, selects the print file FL02 to be printed from the print data management information of the user name US01, and performs an operation meaning a print request. By the print data management information of the user name US01, it is found that an apparatus in which the print file FL02 to be printed is saved is the slave device CM1.

At step A15, the file acquisition request unit 82 of the slave device CMn transmits a file acquisition request including the name of the print file FL02, to the slave device CM1 in which the print file FL02 is saved.

At step C51, when the slave device CM1 receives the file acquisition request, the print file acquisition unit 85 acquires (reads out) the print file FL02, which is temporarily saved in the slave device CM1, from the storage unit 90 of the slave device CM1.

At step C52, the acquired print file FL02 is attached to a file acquisition response and the file acquisition response is transmitted to the slave device CMn transmitting the file acquisition request.

Next, processing similar to that of FIG. 9 is performed at steps from A16 to A20 in the slave device CMn.

At step A16, the slave device CMn receives the file acquisition response including the print file FL02 and temporarily saves the received print file FL02 in the storage unit 90.

At step A17, the print execution unit 83 of the slave device CMn executes print processing of the print file FL02. At step A18, the output unit 75 of the slave device CMn outputs a sheet on which information of the print file FL02 is printed.

At step A19, the slave device CMn transmits, to the master device PM1, print completion notification indicating that printing of the print file FL02 is completed. The print completion notification includes the print file name FL02, the user name US01, and the name CMn of the slave device that is a used apparatus executing printing.

At step A20, the file deletion unit 84 of the slave device CMn deletes the print file FL02 temporarily saved in the slave device CMn. In a case where setting not to delete the print file is performed, however, the print file FL02 is not deleted.

At step M55, the master device PM1 receives the print completion notification. At step M56, the use frequency update unit 40 updates the user use frequency information 55b. Here, 1 is added to the total use count AM corresponding to the user name US01 and 1 is added to the use count CT of the slave device CMn of the used apparatus information HM corresponding to the user name US01.

At step M61, the file deletion request unit 36 of the master device PM1 transmits, to the slave device CM1 in which the print file FL02 is saved, a file deletion request to request deletion of the print file FL02.

At step C53, when the slave device CM1 receives the file deletion request, the file deletion unit 84 of the slave device CM1 deletes the print file FL02. Here, when the print file FL02 is deleted, the remaining capacity of the slave device CM1 is increased. In a case where setting not to delete the print file is performed in the slave device CM1, however, the deletion may not be performed.

At step C54, the slave device CM1 transmits, to the master device PM1, a file deletion response indicating that the print file FL02 is deleted.

At step M62, the master device PM1 receives the file deletion response and confirms that the print file FL02 is deleted.

At step M58, since the print file FL02 is deleted from the slave device CM1, the print data management information update unit 38 updates the print data management information 55a. Here, information in which the saved file name FL02, the user name US01, and the slave device CM1 of the saving apparatus information HM are associated with each other is deleted from the print data management information 55a of FIG. 4A. In the present exemplary embodiment, since the storage capacity of the master device PM1 does not change, the own remaining capacity of the master device PM1 may not be updated.

By the foregoing sequence, the user selects the print file FL02 to be printed and performs an operation meaning a print request in the slave device CMn, so that even when the user does not know an apparatus (slave device CM1) in which the print file FL02 is saved, a sheet on which information of the print file FL02 is printed is output from the slave device CMn in which the user performs the operation.

Exemplary Embodiment 3 of Printing

Figure 11:
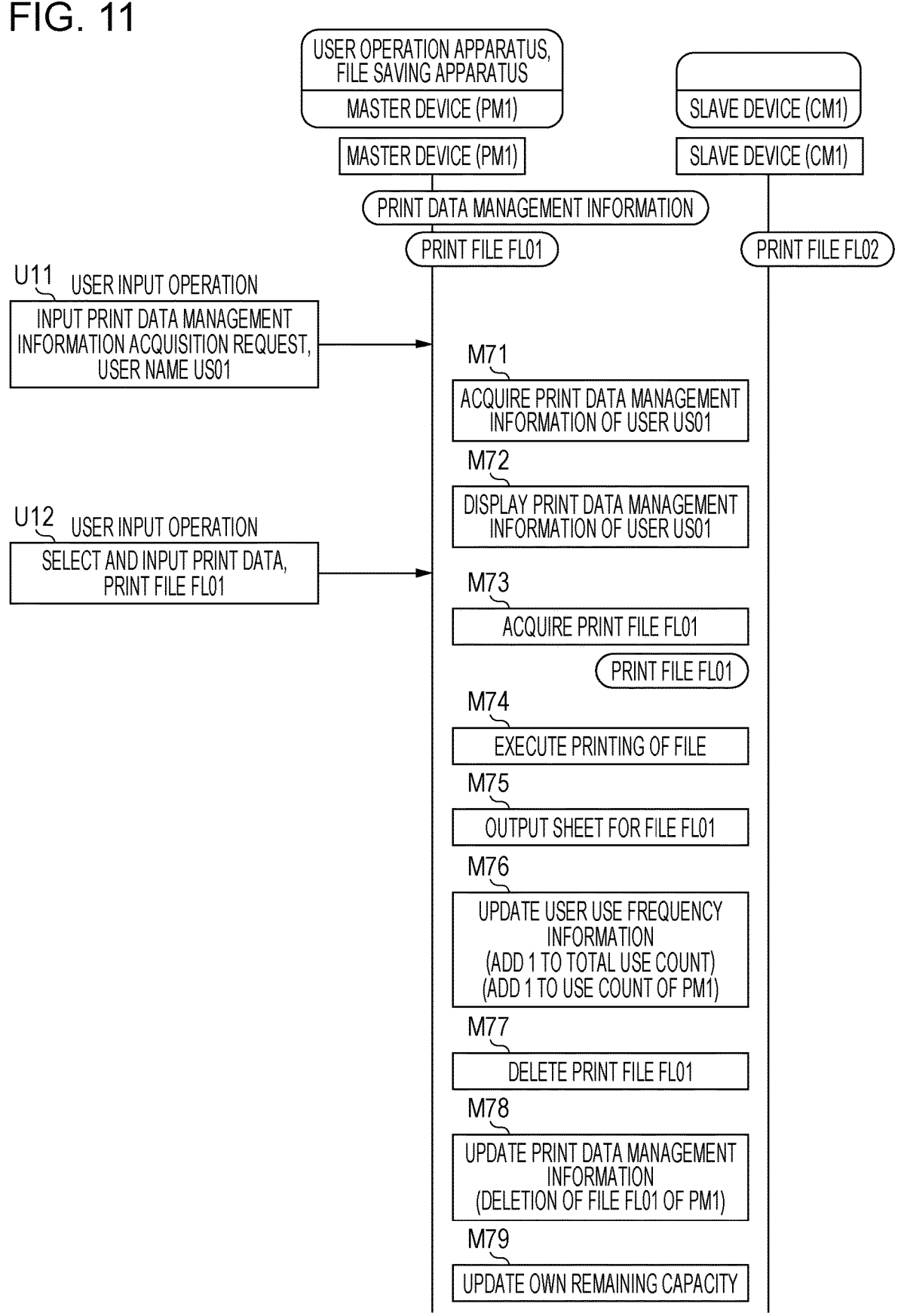
FIG. 11 illustrates a detailed sequence of an exemplary embodiment of processing in which a print file saved in the master device is printed in the master device.

FIG. 11 illustrates the detailed sequence of an exemplary embodiment of processing in which a print file saved in the master device is printed in the master device.

In FIG. 11, it is assumed that an operation apparatus by which the user with the user name US01 selects a print file to be printed to perform a print operation is the master device PM1 and a saving apparatus in which the print file FL01 itself to be printed by the user US01 is saved is also the master device PM1.

It is also assumed that the print data management information 55a is stored in advance in the mater device PM1.

Further, it is assumed that names of the print files FL01 and FL02 are stored in the print data management information 55a in association with the user name US01 as illustrated in FIG. 4A. That is, it is assumed that two print files (FL01 and FL02) for the user with the user name US01 are respectively stored in the master device PM1 and the slave device CM1.

First, at step U11, it is assumed that the user with the user name US01 performs an input operation of requesting print data management information of the user name US01 by using the operation unit 22 of the master device PM1.

At step M71, since the print data management information that is requested is stored in the own storage unit 50 of the master device PM1, the print data management information acquisition unit 31 of the master device PM1 acquires (reads out) the print data management information 55a from the storage unit 50. Here, only print data management information in which US01 is stored as the user name UN is searched for and read out in the print data management information 55a of FIG. 4A.

At step M72, the print data management information of the user name US01 is displayed on the display unit 24.

At step U12, the user US01 confirms the displayed print data management information, selects the print file FL01 to be printed from the print data management information of the user name US01, and performs an operation meaning a print request.

At step M73, since the print file FL01, printing of which is requested to the master device PM1, is stored in the own storage unit 50 of the master device PM1, the print file acquisition unit 35 acquires (reads out) the print file FL01, which is temporarily saved, from the storage unit 50 of the master device PM1.

At step M74, the print execution unit 33 of the master device PM1 executes print processing of the print file FL01.

At step M75, the output unit 25 of the master device PM1 outputs a sheet on which information of the print file FL01 is printed.

At step M76, the use frequency update unit 40 updates the user use frequency information 55b. Here, 1 is added to the total use count AM corresponding to the user name US01 and 1 is added to the use count CT of the master device PM1 of the used apparatus information HM corresponding to the user name US01.

At step M77, the file deletion unit 34 of the master device PM1 deletes the print file FL01 temporarily saved in the master device PM1. Thereby, the print file FL01 is deleted, so that the remaining capacity of the master device PM1 is increased. In a case where setting not to delete the print file is performed, however, the deletion is not be performed.

At step M78, since the print file FL01 is deleted from the master device PM1, the print data management information update unit 38 updates the print data management information 55a. Here, information in which the saved file name FL01, the user name US01, and PM1 of the saving apparatus information HM are associated with each other is deleted from the print data management information 55a of FIG. 4A.

At step M79, since the saved file FL01 is deleted, the own remaining capacity of the master device PM1 is updated. The own remaining capacity of the master device PM1 is increased. Here, the current own remaining capacity is confirmed by the own remaining capacity confirmation unit 41a and stored in the own remaining capacity information 52.

By the foregoing sequence, the user selects the print file FL01 to be printed and performs an operation meaning a print request in the master device PM1, so that even when the user does not know an apparatus (master device PM1) in which the print file FL01 is saved, a sheet on which information of the print file FL01 is printed is output from the master device PM1 in which the user performs the operation.

Exemplary Embodiment 4 of Printing

Figure 12:
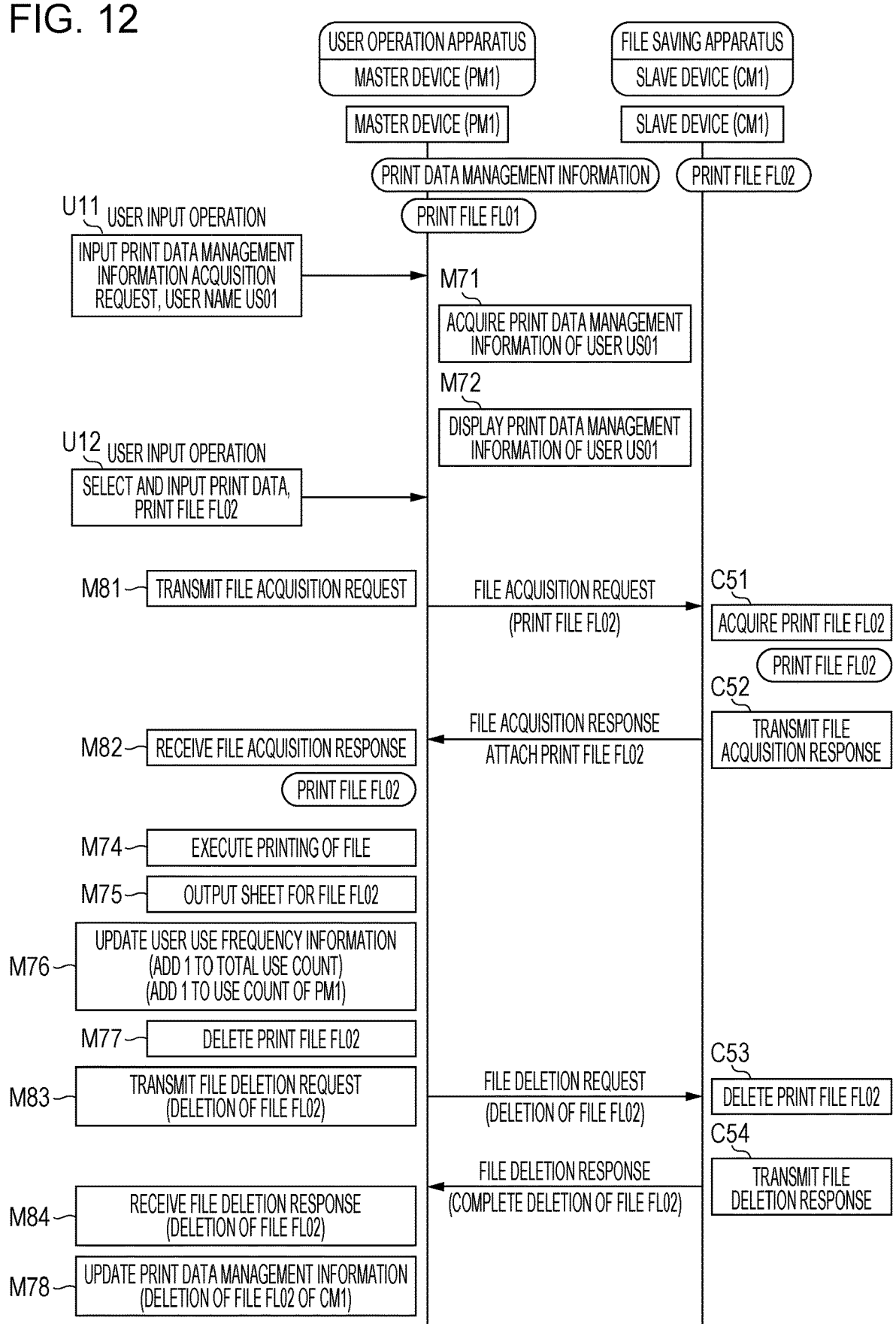
FIG. 12 illustrates a detailed sequence of an exemplary embodiment of processing in which a print file saved in a slave device is printed in the master device.

FIG. 12 illustrates the detailed sequence of an exemplary embodiment of processing in which a print file saved in a slave device is printed in the master device.

In FIG. 12, it is assumed that an operation apparatus by which the user with the user name US01 selects a print file to be printed to perform a print operation is the master device PM1 and a saving apparatus in which the print file FL02 itself to be printed by the user US01 is saved is the slave device CM1.

It is also assumed that the print data management information 55a is stored in advance in the mater device PM1.

Further, it is assumed that names of the print files FL01 and FL02 are stored in the print data management information 55a in association with the user name US01 as illustrated in FIG. 4A. That is, it is assumed that two print files (FL01 and FL02) for the user with the user name US01 are respectively stored in the master device PM1 and the slave device CM1.

In the sequence of FIG. 12, a step at which similar processing to that of the step of FIG. 11 is performed will be given the same number.

First, at step U11, it is assumed that the user with the user name US01 performs an input operation of requesting print data management information of the user name US01 by using the operation unit 22 of the master device PM1.

At step M71, since the print data management information that is requested is stored in the own storage unit 50 of the master device PM1, the print data management information acquisition unit 31 of the master device PM1 acquires (reads out) the print data management information 55a from the storage unit 50. Here, only print data management information in which US01 is stored as the user name UN is searched for and read out in the print data management information 55a of FIG. 4A.

At step M72, the print data management information of the user name US01 is displayed on the display unit 24.

At step U12, the user US01 confirms the displayed print data management information, selects the print file FL02 to be printed from the print data management information of the user name US01, and performs an operation meaning a print request.

At step M81, the file acquisition request unit 32 of the master device PM1 transmits a file acquisition request including the name of the print file FL02, to the slave device CM1 in which the print file FL02 is saved.

At step C51, when the slave device CM1 receives the file acquisition request, the print file acquisition unit 85 acquires (reads out) the print file FL02, which is temporarily saved in the slave device CM1, from the storage unit 90 of the slave device CM1.

At step C52, the acquired print file FL02 is attached to a file acquisition response and the file acquisition response is transmitted to the master device PM1 transmitting the file acquisition request.

At step M82, the master device PM1 receives the file acquisition response including the print file FL02 and temporarily stores the received print file FL02 in the storage unit 90.

Next, processing similar to that of FIG. 11 is performed at steps from M74 to M77.

At step M74, the print execution unit 33 of the master device PM1 executes print processing of the print file FL02.

At step M75, the output unit 25 of the master device PM1 outputs a sheet on which information of the print file FL02 is printed.

At step M76, the use frequency update unit 40 updates the user use frequency information 55b. Here, 1 is added to the total use count AM corresponding to the user name US01 and 1 is added to the use count CT of the master device PM1 of the used apparatus information HM corresponding to the user name US01.

At step M77, the file deletion unit 34 of the master device PM1 deletes the print file FL02 temporarily stored in the master device PM1.

At step M83, the file deletion request unit 36 of the master device PM1 transmits, to the slave device CM1 in which the print file FL02 is saved, a file deletion request to request deletion of the print file FL02. At step C53, when the slave device CM1 receives the file deletion request, the file deletion unit 84 of the slave device CM1 deletes the print file FL02. Here, when the print file FL02 is deleted, the remaining capacity of the slave device CM1 is increased. In a case where setting not to delete the print file is performed in the slave device CM1, however, the deletion may not be performed.

At step C54, the slave device CM1 transmits, to the master device PM1, a file deletion response indicating that the print file FL02 is deleted.

At step M84, the master device PM1 receives the file deletion response and confirms that the print file FL02 is deleted.

At step M78, since the print file FL02 is deleted from the slave device CM1, the print data management information update unit 38 updates the print data management information 55a. Here, information in which the saved file name FL02, the user name US01, and the slave device CM1 of the saving apparatus information HM are associated with each other is deleted from the print data management information 55a of FIG. 4A. In the present exemplary embodiment, since the storage capacity of the master device PM1 does not change, the own remaining capacity of the master device PM1 may not be updated.

By the foregoing sequence, the user selects the print file FL02 to be printed and performs an operation meaning a print request in the master device PM1, so that even when the user does not know an apparatus (slave device CM1) in which the print file FL02 is saved, a sheet on which information of the print file FL02 is printed is output from the master device PM1 in which the user performs the operation.

Exemplary Embodiment 5 of Printing

Figure 13:
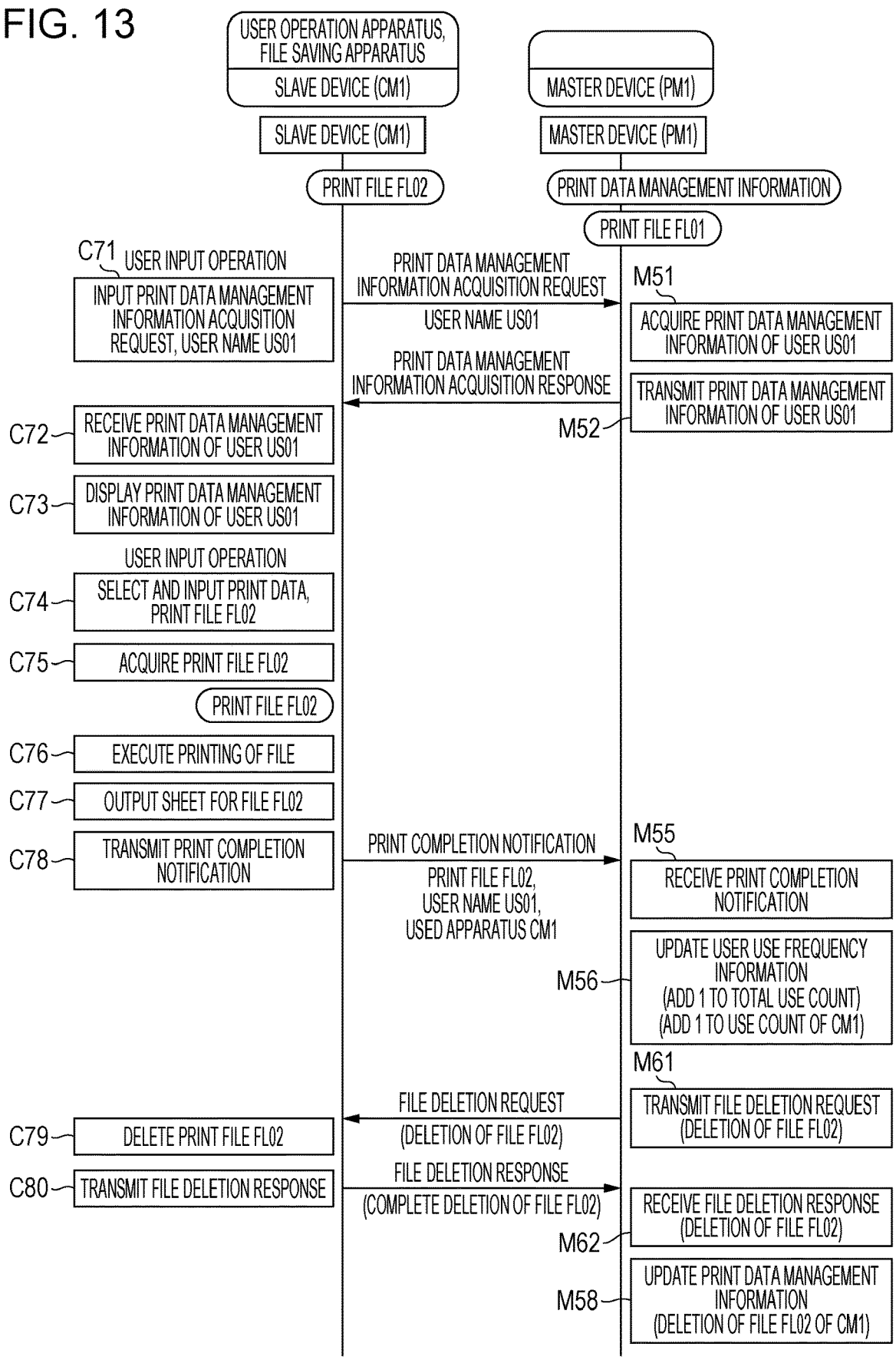
FIG. 13 illustrates a detailed sequence of an exemplary embodiment of processing in which a print file saved in a slave device is printed in the same slave device.

FIG. 13 illustrates the detailed sequence of an exemplary embodiment of processing in which a print file saved in a slave device is printed in the same slave device. In a case where the user executes printing in a slave device that is always frequently used by the user or a slave device that is most frequently used, printing of the print file is performed in accordance with the sequence in many cases. Moreover, also in a case where a slave device to which the print file is moved on the basis of the aforementioned movement condition considering the use frequency is a slave device in which the user is to perform printing from now on, printing of the print file is performed in accordance with the sequence.

In FIG. 13, it is assumed that an operation apparatus by which the user with the user name US01 selects a print file to be printed to perform a print operation is the slave device CM1 and a saving apparatus in which the print file FL02 itself to be printed by the user US01 is saved is also the same slave device CM1.

It is also assumed that the print data management information 55a is stored in advance in the mater device PM1.

Further, it is assumed that names of the print files FL01 and FL02 are stored in the print data management information 55a in association with the user name US01 as illustrated in FIG. 4A. That is, it is assumed that two print files (FL01 and FL02) for the user with the user name US01 are respectively stored in the master device PM1 and the slave device CM1. In the sequence of FIG. 13, a step at which similar processing to that of the step of FIG. 10 is performed will be given the same number.

First, at steps from C71 to C74, processing similar to that of the steps from A11 to A14 of FIG. 10 is performed.

That is, at step C71, when the user with the user name US01 performs an input operation of requesting print data management information of the user name US01 by using the operation unit 72 of the slave device CM1, the print data management information acquisition unit 81 of the slave device CM1 transmits a print data management information acquisition request including the user name US01 to the master device PM1.

At step M51, when the master device PM1 receives the print data management information acquisition request, the print data management information acquisition unit 31 of the master device PM1 acquires (reads out) the print data management information 55a from the storage unit 50. Here, only print data management information in which US01 is stored as the user name UN is searched for and read out in the print data management information 55a of FIG. 4A.

At step M52, the acquired print data management information about the user name US01 is included in a print data management information acquisition response and the print data management information acquisition response is transmitted to the slave device CM1 transmitting the print data management information acquisition request.

At step C72, the slave device CM1 receives the print data management information acquisition response including the print data management information of the user name US01 and reads out the print data management information of the user name US01.

At step C73, the received print data management information of the user name US01 is displayed on the display unit 74.

At step C74, the user US01 confirms the displayed print data management information, selects the print file FL02 to be printed from the print data management information of the user name US01, and performs an operation meaning a print request. By the print data management information of the user name US01, it is found that an apparatus in which the print file FL02 to be printed is saved is the slave device CM1. That is, the print file FL02 selected by the user US01 is saved in the slave device CM1 in which the user US01 currently performs the operation.

At step C75, since the print file FL02 is saved in the slave device CM1 in which the user US01 currently performs the operation, the print file FL02 is acquired (read out) from the storage unit 90 of the slave device CM1.

At step C76, the print execution unit 83 of the slave device CM1 executes print processing of the print file FL02. At step C77, the output unit 75 of the slave device CM1 outputs a sheet on which information of the print file FL02 is printed.

At step C78, the slave device CM1 transmits, to the master device PM1, print completion notification indicating that printing of the print file FL02 is completed. The print completion notification includes the print file name FL02, the user name US01, and the name CM1 of the slave device that is a used apparatus executing printing.

At this time, the file deletion unit 84 of the slave device CM1 may delete the print file FL02 temporarily stored in the slave device CM1.

At step M55, the master device PM1 receives the print completion notification.

At step M56, the use frequency update unit 40 updates the user use frequency information 55b. Here, 1 is added to the total use count AM corresponding to the user name US01 and 1 is added to the use count CT of the slave device CM1 of the used apparatus information HM corresponding to the user name US01.

At step M61, the file deletion request unit 36 of the master device PM1 transmits, to the slave device CM1 in which the print file FL02 is saved, a file deletion request to request deletion of the print file FL02.

At step C79, when the slave device CM1 receives the file deletion request, the file deletion unit 84 of the slave device CM1 deletes the print file FL02. Here, when the print file FL02 is deleted, the remaining capacity of the slave device CM1 is increased. In a case where setting not to delete the print file is performed in the slave device CM1, however, the deletion may not be performed.

At step C80, the slave device CM1 transmits, to the master device PM1, a file deletion response indicating that the print file FL02 is deleted.

At step M62, the master device PM1 receives the file deletion response and confirms that the print file FL02 is deleted.

At step M58, since the print file FL02 is deleted from the slave device CM1, the print data management information update unit 38 updates the print data management information 55a. Here, information in which the saved file name FL02, the user name US01, and the slave device CM1 of the saving apparatus information HM are associated with each other is deleted from the print data management information 55a of FIG. 4A. In the present exemplary embodiment, since the storage capacity of the master device PM1 does not change, the own remaining capacity of the master device PM1 may not be updated.

By the foregoing sequence, the user selects the print file FL02 to be printed and performs an operation meaning a print request in the slave device CM1, so that even when the user does not know an apparatus (slave device CM1) in which the print file FL02 is saved, a sheet on which information of the print file FL02 is printed is output from the slave device CM1 in which the user performs the operation.

Moreover, since the apparatus (slave device CM1) in which the print file FL02 is saved is the apparatus in which the user currently performs the operation, it is not required to perform data communication such as an acquisition request of the print file FL02 and it is only required to read out the print file FL02 from the storage unit of the apparatus in which the operation is performed, and is it possible to shorten a time until printing is completed after a print request is given.

In particular, in a case where an image forming apparatus in which a print file input by the user is saved is an image forming apparatus that is always frequently used by the user, printing is more likely to be performed in a short time, thus making it possible to further enhance printing efficiency for the user.

The present disclosure contains subject matter related to that disclosed in Japanese Priority Patent Application JP 2018-003575 filed in the Japan Patent Office on Jan. 12, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus having a print function, the image forming apparatus comprising:
    an information input unit that inputs a print file;
    a storage unit that stores user use frequency information including a use count of a user, who uses the image forming apparatus and a different image forming apparatus, for each of the image forming apparatuses, and that temporarily saves the print file which is input;
    a communication unit that exchanges information with the different image forming apparatus connected to a network;
    a use frequency confirmation unit that confirms a use frequency of a given user for each of the image forming apparatuses by using the user use frequency information; and
    a file movement request unit that moves the print file, which is temporarily saved in the storage unit, to the different image forming apparatus, wherein
    the use frequency confirmation unit selects one image forming apparatus which satisfies a predetermined movement condition by using the confirmed use frequency for each of the image forming apparatuses, and
    the file movement request unit moves the print file, which is temporarily saved in the storage unit, to the selected image forming apparatus.

2. The image forming apparatus according to claim 1, wherein
    the use frequency confirmation unit compares, for the user who inputs the print file, use counts of the user for each of the image forming apparatuses and selects an image forming apparatus whose use count is greatest, the use counts being included in the user use frequency information, and
    the file movement request unit moves the print file, which is input by the user, to the selected image forming apparatus.

3. The image forming apparatus according to claim 1, wherein
    a transfer determination number used to determine whether or not to move the print file, which is temporarily saved, to the different image forming apparatus is stored in advance in the storage unit,
    the use frequency confirmation unit selects, for the user who inputs the print file, one image forming apparatus whose use count of the user for each of the image forming apparatuses is greater than the transfer determination number, the use count being included in the user use frequency information, and
    the file movement request unit moves the print file, which is input by the user, to the selected image forming apparatus.

4. The image forming apparatus according to claim 3, wherein
    in a case where there are a plurality of image forming apparatuses whose use counts of the user for each of the image forming apparatuses are greater than the transfer determination number, the use counts being included in the user use frequency information, an image forming apparatus whose use count of the user for each of the image forming apparatuses is greatest is selected.

5. The image forming apparatus according to claim 1, wherein in the user use frequency information, for each of users who have used an image forming apparatus, a user name, a total use count that is a sum of use counts of all image forming apparatuses that have been used by the user, used apparatus information of identifying an image forming apparatus that has been used by the user, and a use count for the image forming apparatus that has been used by the user are stored in association with each other.

6. The image forming apparatus according to claim 5, wherein
    a frequency determination ratio used to determine whether or not to move the print file, which is temporarily saved, to the different image forming apparatus is stored in advance in the storage unit, and
    based on a total use count of a given user and use counts for the image forming apparatuses that have been used by the user, which are stored in the user use frequency information, the use frequency confirmation unit calculates use frequency ratios of the user for the image forming apparatuses, compares the calculated use frequency ratios to the frequency determination ratio, and selects an image forming apparatus whose use frequency ratio is greatest among image forming apparatuses whose use frequency ratios are greater than the frequency determination ratio.

7. The image forming apparatus according to claim 1 further comprising
    an own remaining capacity confirmation unit that confirms a remaining capacity of the storage unit, wherein
    in a case where the confirmed remaining capacity is smaller than predetermined remaining capacity determination information,
    the use frequency confirmation unit selects one image forming apparatus that satisfies the predetermined movement condition.

8. The image forming apparatus according to claim 1 further comprising:
    a file acquisition request unit that acquires a print file, which is saved in the different image forming apparatus, from the different image forming apparatus through the communication unit; and
    a print execution unit that prints information of a given print file on a sheet, wherein
    print data management information of specifying, for each of users, an image forming apparatus in which a print file input by the user is temporarily saved is stored in the storage unit,
    a desired print file is selected by using the print data management information, and in a case where the selected print file is temporarily saved in the different image forming apparatus, after the file acquisition request unit acquires the selected print file from the different image forming apparatus in which the selected print file is temporarily saved, or in a case where the selected print file is temporarily saved in the storage unit, after the selected print file is acquired from the storage unit, the print execution unit prints information of the acquired print file on a sheet.

9. An image processing system comprising one first image forming apparatus and one or more second image forming apparatuses that are connected to each other by a network, wherein the first and second image forming apparatuses each include, an information input unit that inputs a print file, a storage unit that temporarily saves the print file that is input, a communication unit that exchanges information with an image forming apparatus connected to the network, a file acquisition request unit that acquires the print file from a different image forming apparatus, and a print execution unit that prints information of a given print file on a sheet, the first image forming apparatus stores, in the storage unit of the first image forming apparatus, print data management information of specifying, for each of users, an image forming apparatus in which a print file input by the user is temporarily saved and user use frequency information including a use count of the user, who uses the first image forming apparatus and the one or more second image forming apparatuses, for each of the image forming apparatuses, the first image forming apparatus includes a use frequency confirmation unit that confirms a use frequency of a given user for each of the image forming apparatuses by using the user use frequency information, and a file movement request unit that moves a print file, which is temporarily saved in the storage unit of the first image forming apparatus, to the second image forming apparatus, the use frequency confirmation unit selects a second image forming apparatus that satisfies a predetermined movement condition by using the confirmed use frequency for each of the image forming apparatuses, the file movement request unit moves, to the selected second image forming apparatus, the print file temporarily saved in the storage unit of the first image forming apparatus, and in a case where any image forming apparatus acquires the print data management information from the first image forming apparatus and uses the print data management information to select a print file desired to be printed and input a print request of the selected print file, the file acquisition request unit acquires the selected print file from the first or second image forming apparatus in which the selected print file is saved, and the print execution unit of the any image forming apparatus prints information of the selected print file on a sheet.

10. An image processing system comprising one first image forming apparatus and one or more second image forming apparatuses that are connected to each other by a network, wherein a print file is saved in a distributed manner in the first and second image forming apparatuses based on a use frequency of each of users, who use the image forming apparatuses, for each of the image forming apparatuses, print data management information of specifying, for each of the users, the first or second image forming apparatus in which a print file input by the user is temporarily saved is stored in the first image forming apparatus, a print file of a given user, which is temporarily saved in the first image forming apparatus, is moved to the second image forming apparatus that is frequently used by the user, in a case of satisfying a predetermined movement condition in consideration of a use frequency of the user, and in any image forming apparatus, by using the print data management information acquired from the first image forming apparatus, a print file desired to be printed is acquired from the first or second image forming apparatus in which the desired print file is saved, and then, printing is performed.

11. A file printing method of an image processing system including one first image forming apparatus and one or more second image forming apparatuses that are connected to each other by a network, the file printing method comprising:

storing, in the first image forming apparatus, print management information about all image forming apparatuses in which a print file input by a user is temporarily saved, the print management information including print data management information of specifying, for each of users, the first or second image forming apparatus in which the print file input by the user is temporarily saved, and user use frequency information including a use count of the user who uses the first and second image forming apparatuses for each of the image forming apparatuses;

temporarily saving, in the first image forming apparatus, the print file input by the user;

confirming a use frequency of a given user for each of the image forming apparatuses by using the user use frequency information;

selecting a second image forming apparatus that satisfies a predetermined movement condition by using the confirmed use frequency for each of the image forming apparatuses;

moving, to the selected second image forming apparatus, the print file temporarily saved in the first image forming apparatus; and in a case where any image forming apparatus acquires the print data management information from the first image forming apparatus and uses the print data management information to select a print file desired to be printed and input a print request of the selected print file, when the selected print file is temporarily saved in a different image forming apparatus, acquiring the selected print file from the different image forming apparatus in which the selected print file is temporarily saved and then printing information of the acquired print file on a sheet by the any image forming apparatus, or when the selected print file is temporarily saved in the any image forming apparatus in which the print request is input, reading out information of the selected print file and printing the information on a sheet by the any image forming apparatus.

* * * * *